(12) United States Patent
Biradar et al.

(10) Patent No.: US 11,153,199 B2
(45) Date of Patent: Oct. 19, 2021

(54) FORWARDING PATH FAILURE DETECTION USING PACKET LOOP

(71) Applicant: Arista Networks, Inc., Santa Clara, CA (US)

(72) Inventors: Rajshekhar Biradar, Bengaluru (IN); Naveen Kumar Devaraj, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 77 days.

(21) Appl. No.: 16/698,922

(22) Filed: Nov. 27, 2019

(65) Prior Publication Data

US 2021/0160173 A1     May 27, 2021

(51) Int. Cl.
*H04L 12/703* (2013.01)
*H04L 12/26* (2006.01)
*H04L 12/46* (2006.01)
*H04L 12/733* (2013.01)
*H04L 29/12* (2006.01)

(52) U.S. Cl.
CPC .......... *H04L 45/28* (2013.01); *H04L 12/4633* (2013.01); *H04L 12/4641* (2013.01); *H04L 43/12* (2013.01); *H04L 45/20* (2013.01); *H04L 61/6022* (2013.01)

(58) Field of Classification Search
CPC ..... H04L 45/28; H04L 45/20; H04L 12/4633; H04L 43/12
See application file for complete search history.

(56) References Cited

U.S. PATENT DOCUMENTS

| | | | |
|---|---|---|---|
| 10,063,452 B1* | 8/2018 | Dzierwinski | ....... H04L 43/0847 |
| 2017/0041209 A1* | 2/2017 | Joshi | ....................... H04L 45/38 |
| 2020/0304477 A1* | 9/2020 | Venkataraman | .... H04L 12/4633 |
| 2020/0336401 A1* | 10/2020 | Cociglio | ............... H04L 47/283 |
| 2021/0014145 A1* | 1/2021 | Cai | ..................... H04L 43/0811 |
| 2021/0051112 A1* | 2/2021 | Wondra | ................. H04L 47/36 |
| 2021/0092054 A1* | 3/2021 | Kondapavuluru | ...... H04L 63/04 |

* cited by examiner

*Primary Examiner* — Jamal Javaid
*Assistant Examiner* — Ryan C Kavleski
(74) *Attorney, Agent, or Firm* — Fountainhead Law Group P.C.

(57) ABSTRACT

A packet loop runs between two participating endpoint network devices, and in particular runs in the respective data planes of the endpoint devices. A probe packet is provided to the data plane of an initiating device and is forwarded to the other device to initiate the packet loop. The source and destination addresses in the probe packet are set equal to a common address. Based on the common address, entries in the respective forwarding tables of the endpoint devices are established to point to each other so that the probe packet is forwarded back and forth between the two devices thus sustaining the packet loop. A broken loop indicates a forwarding path failure at which time corrective action to be taken.

20 Claims, 16 Drawing Sheets

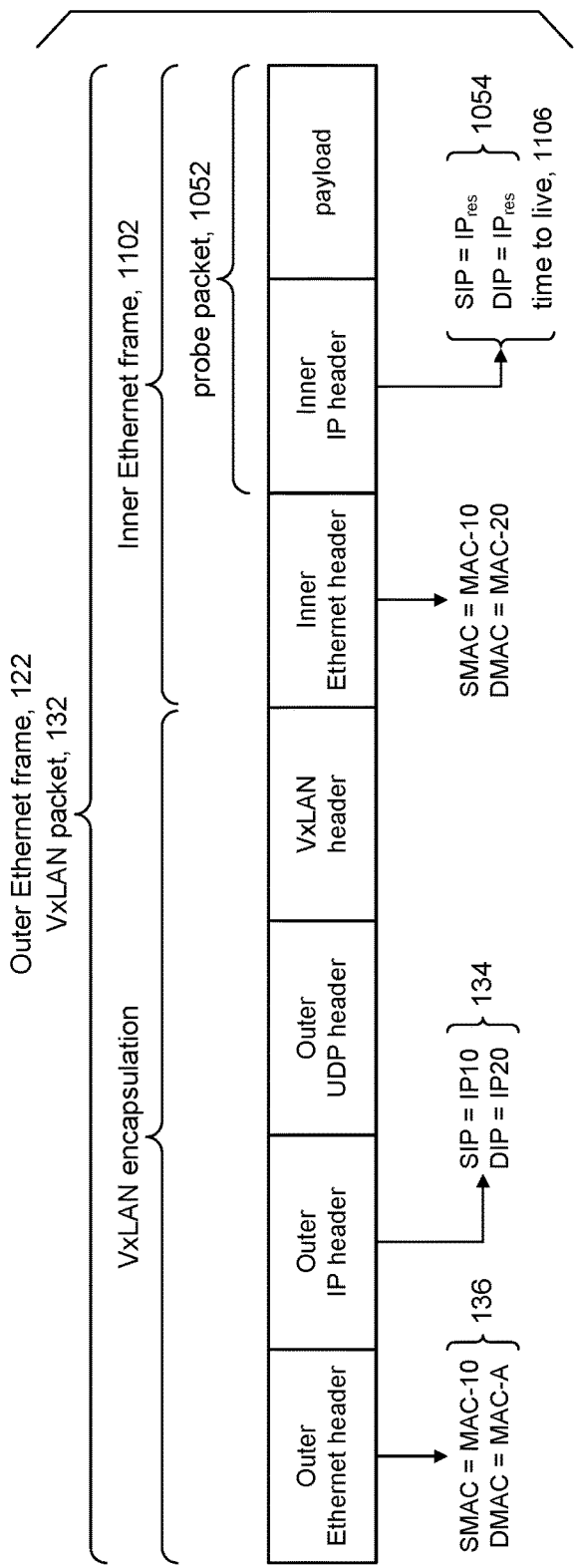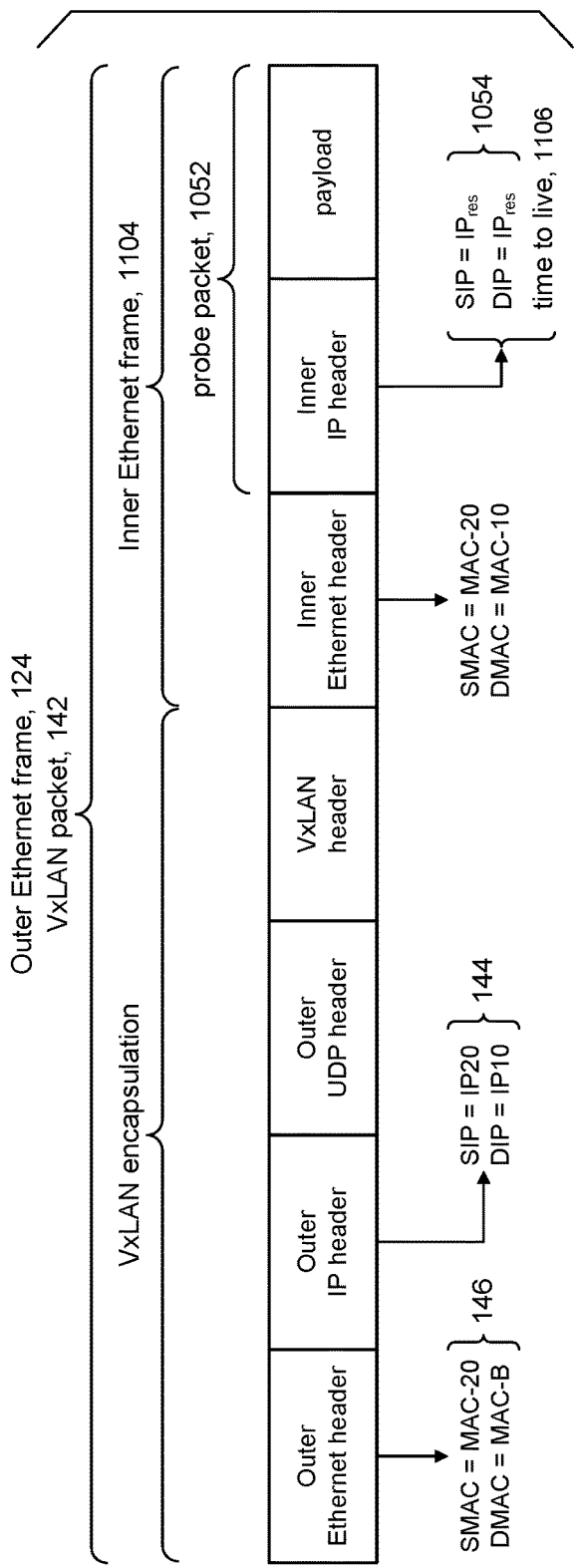

FORWARDING PATH FAILURE DETECTION USING PACKET LOOP

BACKGROUND

Present-day data networks call for high data speeds, and networks that carry real-time traffic such as teleconferencing video, voice-over-IP, and the like require fast convergence times in order to recover from path faults. Common routing protocols are able to quickly select alternate paths (i.e., converge) once they detect a fault but it takes time to detect the fault to begin with. An increasingly important feature of routing protocols therefore is the rapid detection of communication failures between adjacent systems in order to more quickly establish alternative paths. Fault detection between systems typically involves sending heartbeat packets (e.g., a Hello packet) between the systems. If a packet is not received within a predetermined window of time, a fault can be indicated and corrective action can be taken.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 11A, 11B illustrate details of a VxLAN packet in accordance with the present disclosure.

DETAILED DESCRIPTION

Figure 1:
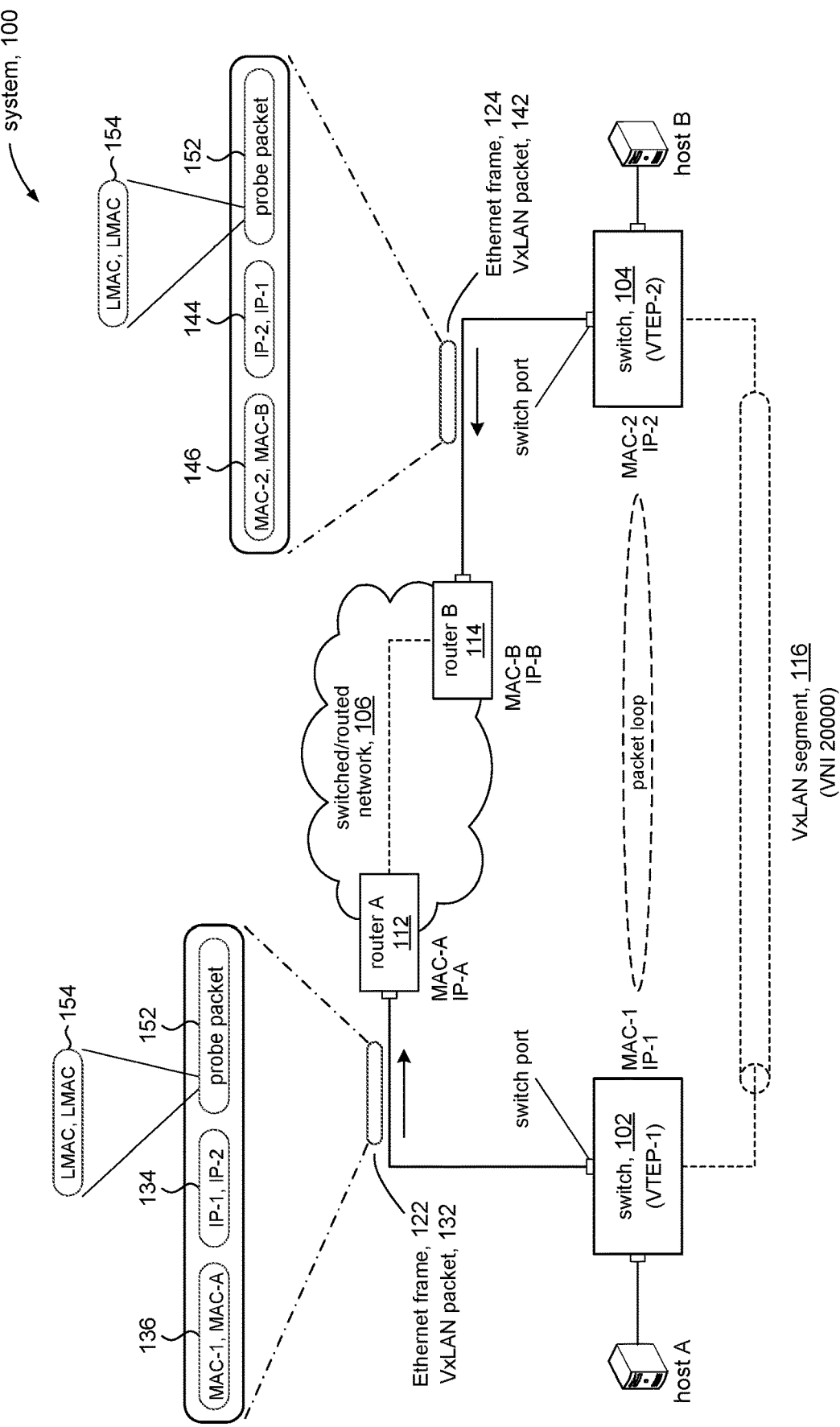
FIG. 1 shows a system adapted for packet loops in accordance with the present disclosure.

The present disclosure describes initiating and sustaining packet loops between endpoint devices in a data network in order to detect the occurrence of a path failure between the endpoint devices. In various embodiments, a probe packet is continually forwarded between the endpoint devices, thus defining a packet loop. In various embodiments, a packet loop runs in the respective data planes of the endpoint devices. Since the probe packet is forwarded in the data planes using the same hardware and firmware that is used for processing regular network traffic, the packet loop can run at a speed comparable to wire speed. A path fault can therefore be detected much more quickly than by conventional techniques.

By comparison, for example, a common fault detection technique uses the Bidirectional Forwarding Detection (BFD) protocol to detect link failures. BFD packets are generally processed in the control plane of the device running the BFD protocol. A typical BFD sequence includes the control plane of a first device A sending a BFD packet to a second device B. The control plane of device B can process the received packet and in response send a BFD packet back to device A which is then processed in the control plane of device A, and so on. The BFD protocol provides for BFD Echo packets. When device A sends a BFD Echo packet to device B, device B processes the received echo packet in its data plane to reflect the packet back to device A; i.e., the echo packet is reflected back to device A based on forwarding table entries in the data plane and so there is no interaction in the control plane of device B. The BFD Echo packet only makes one round trip between device A and device B. When the reflected BFD Echo packet returns to device A, the packet is processed in the control plane of device A, for example, to log that the echo packet came back and hence the link is still up, to set up another echo packet to continue monitoring the link, and so on.

This reliance on the control plane for processing BFD Echo packets can impact performance. The control plane provides path determination functionality for a network device; the control plane generally does not involve packet forwarding. Packet forwarding happens in the packet processor referred to as the data plane. The control plane runs on a conventional general purpose central processing unit (CPU) such as might be found in personal computers typically referred to as the route processor. BFD functionality can be implemented either on the main route processor or a separate co-processor such as the module CPU. Some manufacturers who implement BFD in the module CPU refer to the implementation as a "hardware BFD" since there is no fate sharing with the route processor. Nonetheless, processing bandwidth in the module CPU is limited and so the fault detection using BFD can be slow and sporadic; it also limits the total number of BFD sessions on the system and imposes constraints on using aggressive BFD timers.

On the other hand, detecting packet failures in accordance with the present disclosure does not require continuous packet generation and processing by the control plane processor. Embodiments in accordance with the present disclosure promote scaling; the control plane processor is no longer a bottleneck as in the case of conventional designs.

Since processing a packet loop in accordance with the present disclosure takes place in the data plane independently of the control plane, activity in the control plane will not affect the packet loop. For example, if the control plane is rebooted, the data plane can continue the packet loop uninterrupted. In addition, packet loops in accordance with the present disclosure can be extended to multiple hops, whereas the conventional BFD Echo packet is limited to a single hop.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

FIG. 1 depicts a system level diagram for a networked system 100 in accordance with some embodiments of the present disclosure. The networked system 100, for example, can include network nodes or network devices (e.g., switches 102, 104) interconnected by a switched/routed network 106. In some embodiments, for instance, switches 102, 104 can be so-called L3 (Layer 3) switches or routing switches, which combine the functionality of a router (a Layer 3 device) with switching (Layer 2) functionality. Switches 102, 104 can be connected to a switched/routed network 106 via respective routers 112, 114 that serve as edge devices into the switched/routed network. It is noted that routers 112, 114 are typically inter-connected by a routed network but this is not always the case; the network can either be switched or routed network and so the network 106 can be referred to as a switched/routed network to be generic.

Layer 2 and Layer 3 refer to the Open System Interconnection model (OSI). The OSI model defines communications in a networking framework in seven layers, which are generally understood as follows. Layer 1 (physical layer) represents the hardware to send and receive electrical signals, optical signals, radio signals, etc. over a suitable medium. Layer 2 (data link layer) provides encoding and decoding of the signals into bits, handling bit-level errors, and framing of bits. Layer 2 includes the media access control (MAC) sublayer. Layer 3 (network layer) provides routing functionality to create logical paths between computers (e.g., using network protocols such as Internet Protocol). Layer 4 (transport layer) supports transparent transfer of data between end systems. Layer 5 (session layer) establishes and terminates connections between applications running on host machines. Layer 6 (presentation layer) is responsible for the presentation of data to a user. Layer 7 (application layer) provides support for communication between applications across the network.

Continuing with FIG. 1, in accordance with some embodiments, the networked system 100 can be configured to provide tunneling between switches 102, 104. Although the present disclosure is explained in terms of tunneling, it will be appreciated that embodiments in accordance with the present disclosure can be single-hop embodiments.

Tunneling refers to the transmission of data intended for use within one network (e.g., a private corporate network) over another network (e.g., a public network) in such a way that nodes in the public network are unaware that the data being routed constitute transmissions in the private network. Tunneling is generally done by encapsulating the private network data within the public network transmission units so that the private network data appears to the public network simply as data. For purposes of the present disclosure, the embodiments disclosed herein will use the Virtual Extensible Local Area Network (VxLAN) tunneling technology as the underlying tunneling mechanism. It will be appreciated by persons of ordinary skill, however, that the present disclosure can be adapted for use with other known tunneling protocols, including but not limited to IP-in-IP, IP security (IPSec), Generic Routing Encapsulation (GRE), Network Virtualization using Generic Routing Encapsulation (NVRE), Multi-Protocol Label Switching (MPLS) and others.

In some embodiments, switches 102, 104 can each be configured as VxLAN tunnel endpoints (VTEPs), which provide encapsulation and decapsulation functionality. Switch 102 can be configured to provide functionality for VTEP-1 and switch 104 can be configured to provide functionality for VTEP-2. VTEP-1 and VTEP-2 support communication between respective switches 102, 104 over a VxLAN tunnel, which is logically depicted in FIG. 1 as VxLAN segment (tunnel) 116 and identified by a VxLAN network identifier (VNI) 20000.

The network devices (switches 102, 104, routers 112, 114) shown in FIG. 1 are associated with various network addresses. Each network device, for example, is associated with a media access control (MAC) address and an IP address. A MAC address is a 12-digit hexadecimal number that is typically represented by colon-hex notation, for example, 00:31:C3:8E:A3:69. An IP address is a 32-bit numeric address that is typically written as four numbers (0-255) separated by periods, for example, 192.32.20.1. For the sake of brevity, however, the MAC addresses and IP addresses used in the present disclosure will be symbolically represented. For example, as depicted in FIG. 1, switch 102 is associated with a MAC address MAC-1 and an IP address IP-1 (the IP address of VTEP-1). Likewise, switch 104 is associated with a MAC address MAC-2 and an IP address IP-2 (the IP address of VTEP-2). Router 112 is associated with a MAC address MAC-A and an IP address IP-A, and router 114 is associated with a MAC address MAC-B and an IP address IP-B.

Generally, communication across VxLAN segment 116 includes switch 102 sending/receiving VxLAN packets to/from switch 104 over the switched/routed network 106. More specifically, for example, when host A (connected to switch 102) sends data to host B (connected to switch 104), VTEP-1 in switch 102 will encapsulate data (e.g., Ethernet frames) received from host A in accordance with the VxLAN tunneling protocol to create VxLAN packets. The VxLAN packets are then transmitted to VTEP-2 via the switched/routed network 106. VTEP-2 can decapsulate received VxLAN packets to recover encapsulated data frames and deliver them to host B. Likewise, VTEP-2 in switch 104 can encapsulate data received from host B to create VxLAN packets for transmission to switch 102.

In accordance with the present disclosure, switches 102, 104 can be configured to monitor a data path between respective switch ports on the two switches over a VxLAN tunnel. In some embodiments, a probe packet 152 can be transmitted back and forth between switches 102, 104 in a packet loop (forwarding loop). In accordance with some embodiments of the present disclosure, the probe packet 152 can be an inner Ethernet frame that is encapsulated in a VxLAN packet 132, 142. The probe packet 152 can include an inner MAC address pair 154 comprising an inner source MAC address and an inner destination MAC address. In accordance with the present disclosure, the inner source MAC address and inner destination MAC address are set equal to each other. FIG. 1, for example, shows that the inner source and destination MAC addresses of probe packet 152 are both set to a MAC address represented symbolically as LMAC. This aspect of the present disclosure is discussed in more detail below.

Switch 102 can send the probe packet 152 to switch 104 over a VxLAN. The probe packet 152 can be encapsulated in VxLAN packet 132. The VxLAN packet 132 can include an outer IP address pair 134 comprising an outer source IP address and an outer destination IP address. In the example depicted in FIG. 1, for instance, the outer source IP address is set to the IP address of VTEP-1, namely IP-1, and the outer destination IP address is set to the IP address of VTEP-2, namely IP-2. The VxLAN packet 132 can include an outer MAC address pair 136 comprising an outer source MAC address and an outer destination MAC address, which in the example of FIG. 1, are MAC-1 and MAC-A respectively, and from the point of view of Layer 2 (link layer) VxLAN packet 132 can be referred to as an Ethernet frame 122.

When switch 104 receives VxLAN packet 132, switch 104 can forward the same probe packet 152 back to switch 102. The probe packet 152 can be encapsulated in VxLAN packet 142. The VxLAN packet 142 can include an outer IP address pair 144 comprising an outer source IP address and an outer destination IP address. In the example depicted in FIG. 1, for instance, the outer source IP address is set to the IP address of VTEP-2, namely IP-2, and the outer destination IP address is set to the IP address of VTEP-1, namely IP-1. The VxLAN packet 142 can include an outer MAC address pair 146 comprising an outer source MAC address and an outer destination MAC address, which in the context of FIG. 1, are MAC-2 and MAC-B respectively, and from the point of view of Layer 2 (link layer) VxLAN packet 142 can be referred to as an Ethernet frame 124.

Figure 2A:
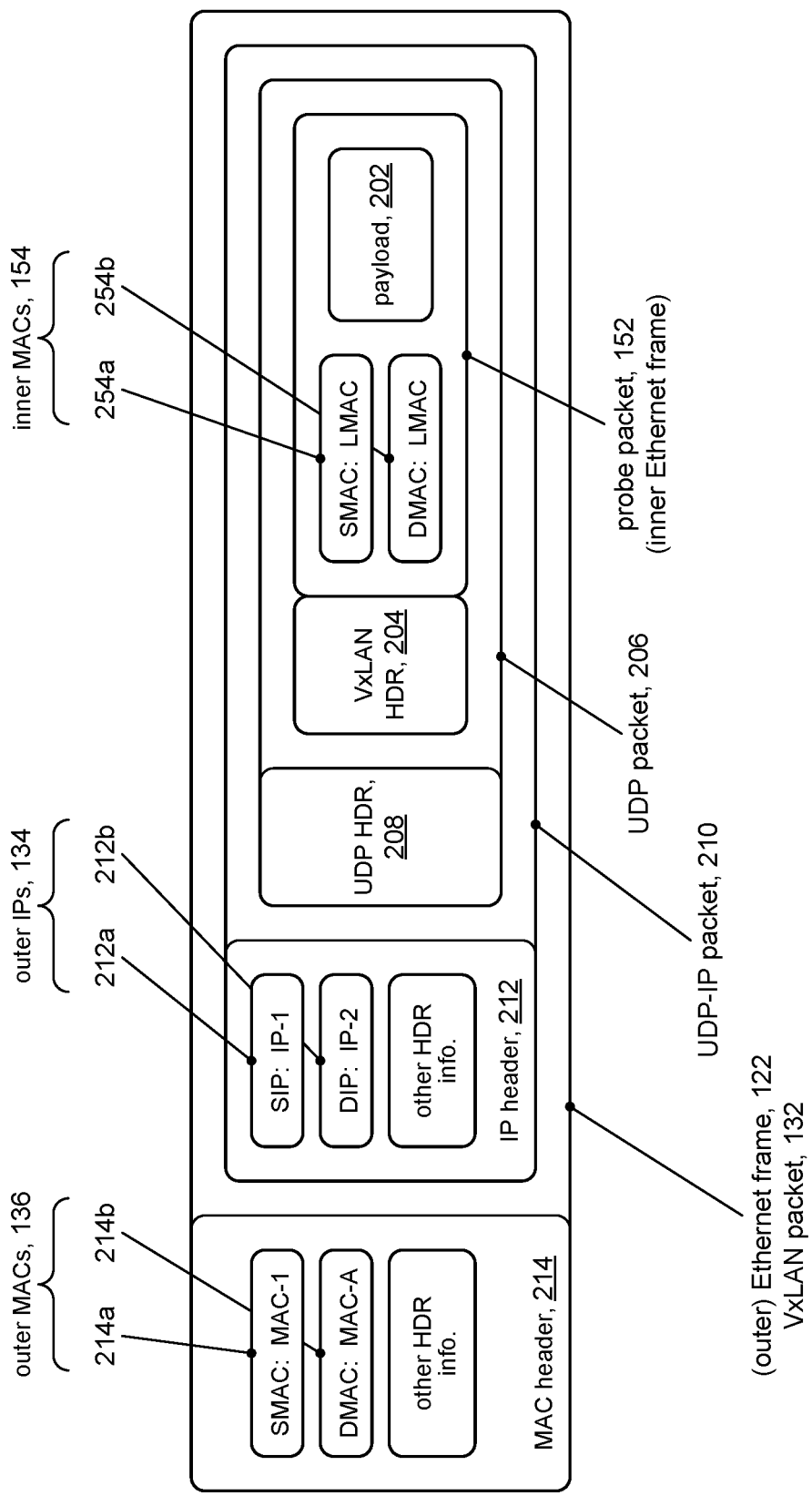
FIGS. 2A and 2B illustrate details of a VxLAN packet in accordance with the present disclosure.
Figure 2B:
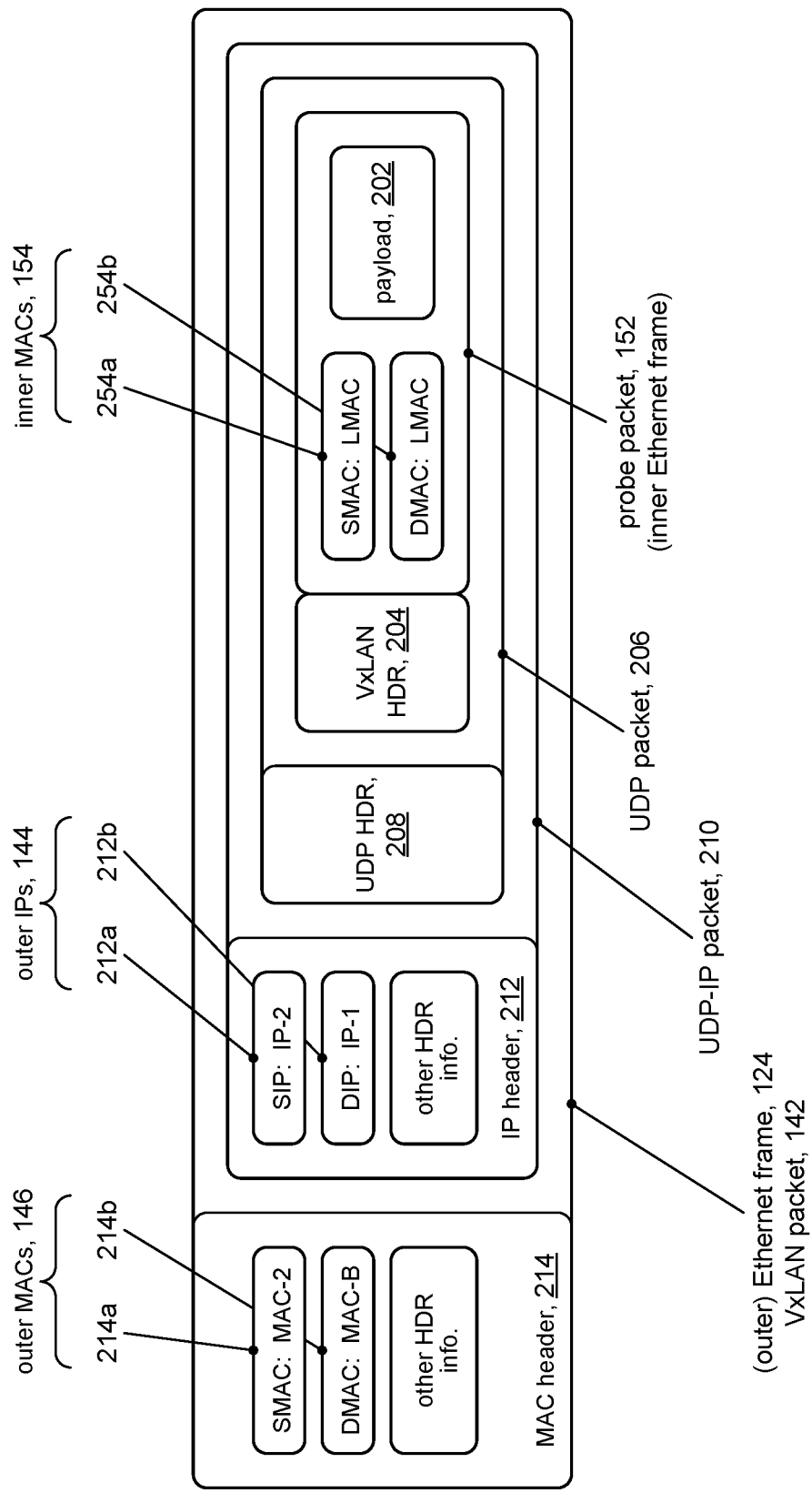

FIGS. 2A and 2B show additional details of respective VxLAN packets 132, 142. Referring to FIG. 2A, for example, in order to send the probe packet 152 from VTEP-1 in switch 102 to VTEP-2 in switch 104, the probe packet is encapsulated in VxLAN packet 132 and transmitted from switch 102 to router 112. The probe packet 152 may be referred to as an "inner" Ethernet frame to distinguish from the "outer" Ethernet frame 122. Probe packet 152 can include source and destination MAC addresses 254a, 254b and a payload portion 202. In accordance with some embodiments of the present disclosure, inner source MAC address 254a and inner destination MAC address 254b are both set to the same predetermined MAC address, namely LMAC. The payload portion 202 is not used for the purposes of the present disclosure, and may contain data that is specific particular embodiments of the present disclosure.

In accordance with the VxLAN tunneling protocol, the probe packet 152 can be encapsulated. The encapsulation includes adding a VxLAN header 204 to the probe packet 152. The VxLAN header 204 includes, among other data, a 24-bit segment ID referred as the VxLAN network identifier (VNI). For regular VxLAN traffic, the VNI identifies a VxLAN segment between switches 102, 104. The example shown in FIG. 1, for instance, shows a VxLAN segment 116 having a VNI of 20000. In accordance with the present disclosure, however, the VNI in a probe packet 152 can be reserved VNI so as not to interfere with any VNIs used by the system 100. The combination of VxLAN header 204 and probe packet 152 can be referred to as a "VxLAN frame." The VxLAN frame is placed in a user datagram protocol (UDP) packet 206, which includes a UDP header 208.

The UDP packet 206, in turn, is encapsulated as an Internet protocol (IP) packet to create a UDP-IP packet 210. The IP header portion 212 of the UDP-IP packet 210 includes an outer source IP address 212a and outer destination IP address 212b, among other header information. The outer IP addresses 212a, 212b specify the source VTEP and destination VTEP, respectively, which in the example shown in FIG. 1 are VTEP-1 and VTEP-2. Accordingly, IP-1 (IP address of VTEP-1) is stored in the outer source IP address 212a and IP-2 (IP address of VTEP-2) is stored in the outer destination IP address 212b.

VxLAN packet 132 is formed by adding a MAC header portion 214 to the UDP-IP packet 210, which can then be transmitted from switch 102 as an outgoing Ethernet frame 122. The header portion 214 includes an outer source MAC address 214a and outer destination MAC address 214b, among other header information. The Ethernet frame 122 is sent from switch 102 to the next hop device, that is specified by the destination MAC address 214b, which in the example in FIG. 1 is router A. Accordingly, MAC-1 (MAC address of VTEP-1) is stored in the outer source MAC address 214a and MAC-A (MAC address of router A) is stored in the outer destination MAC address 214b.

As explained in more detail below, in accordance with the present disclosure, the probe packet 152 can be forwarded back to VTEP-1 in response to VTEP-2 receiving and processing VLXAN packet 132 from VTEP-1. Referring to FIG. 2B, the probe packet 152 is encapsulated in VxLAN packet 142 for transmission to VTEP-1. Accordingly, IP-2 (IP address of VTEP-2) is stored in the outer source IP address 212a of the header portion 212 of UDP-IP packet 210 and IP-1 (IP address of VTEP-1) is stored in the outer destination IP address 212b of the header portion. The switch 104 sends the VxLAN packet 142 to router B as an outgoing (outer) Ethernet packet 124, where MAC-2 (MAC address of VTEP-2) is stored in the outer source MAC address 214a of the header portion 214 and MAC-B (MAC address of the next hop device, namely router 114) is stored in the outer destination MAC address 214b of the header portion.

Figure 3:
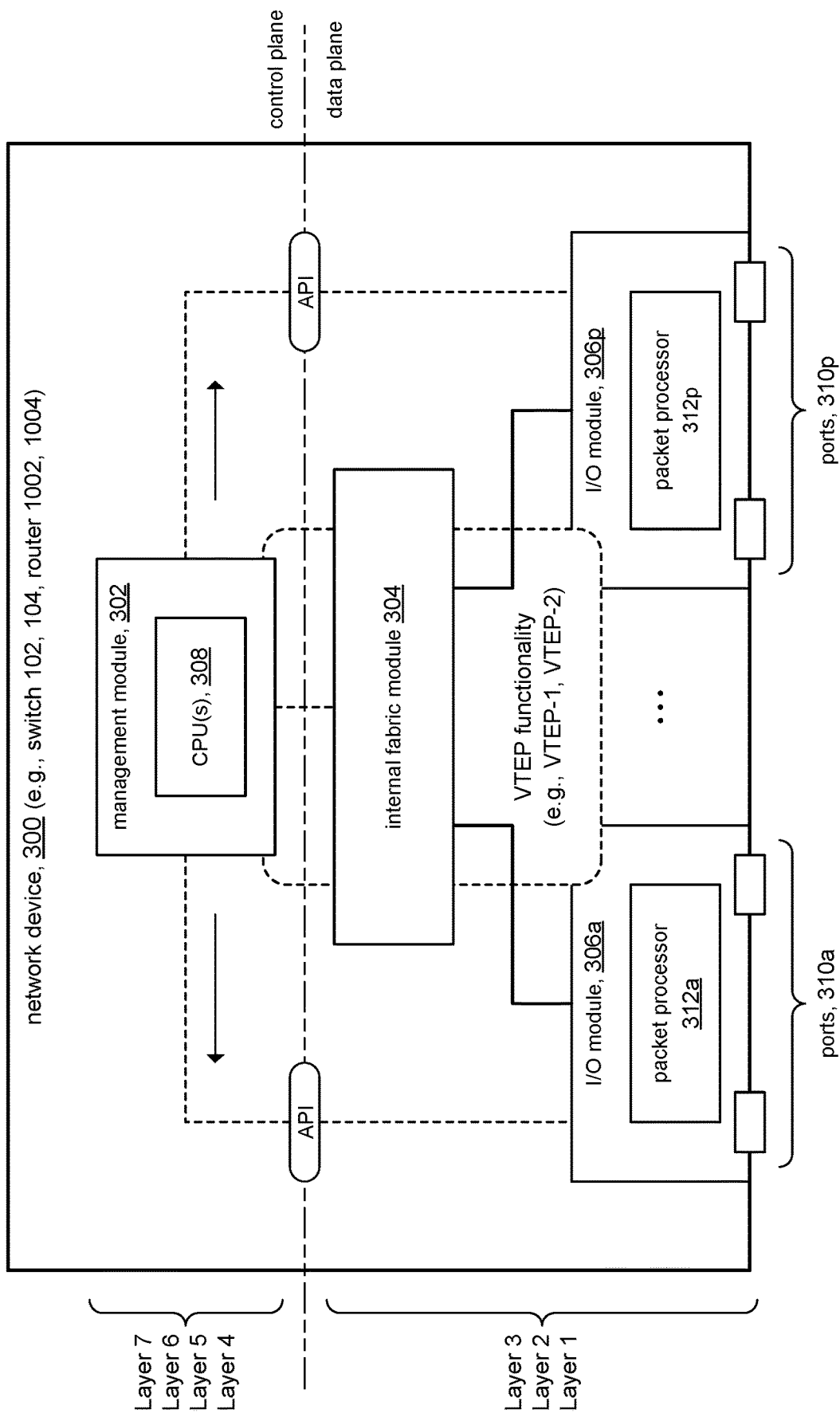
FIG. 3 illustrates details of a network device that can be adapted in accordance with the present disclosure.

FIG. 3 depicts an example of a network device 300 in accordance with some embodiments of the present disclosure. In some embodiments, network device 300 can be a switch (e.g., 102, 104, FIG. 1). In other embodiments, network device 300 can be a router (e.g., 1002, 1004, FIG. 10). As shown, network device 300 includes a management module 302, an internal fabric module 304, and a number of I/O modules 306a-306p. Management module 302 includes the control plane (also referred to as control layer) of network device 300 and can include one or more management CPUs 308 for managing and controlling operation of the device. Each management CPU 308 can be a general purpose processor, such as an Intel®/AMD® x86 or ARM® processor, that operates under the control of software stored in a memory (not shown), such as dynamic random access memory (DRAM). In terms of the OSI model, functionality provided in the control plane via the management module 302 can be functionality typically associated with Layers 4-7. Control plane refers to all the functions and processes that determine which path to use, such a routing protocols, spanning tree, and the like.

Internal fabric module 304 and I/O modules 306a-306p collectively represent the data plane of network device 300 (also referred to as data layer, forwarding plane, etc.). Internal fabric module 304 is configured to interconnect the various other modules of network device 300. Each I/O module 306a-306p includes one or more input/output ports 310a-310p that are used by network device 300 to send and receive network packets. Each I/O module 306a-306p can also include a packet processor 312a-312p. Each packet processor 312a-312p can comprise a hardware processing component (e.g., comprising an ASIC, FPGA, content-addressable memory, and the like) that is configured to make wire speed decisions on how to handle incoming (ingress) and outgoing (egress) network packets. In terms of the OSI model, functionality provided by the packet processors 312a-312p in the data plane is typically associated with Layers 1, 2, and 3. As will become clear, in accordance with some embodiments some aspects of the present disclosure are performed wholly within the data plane.

In accordance with some embodiments, network device 300 can function as a VTEP. As shown in FIG. 3, VTEP functionality typically includes functionality in both the control plane and the data plane. It should be appreciated that network device 300 is illustrative and many other configurations having more or fewer components than shown in FIG. 3 are possible.

Figure 4:
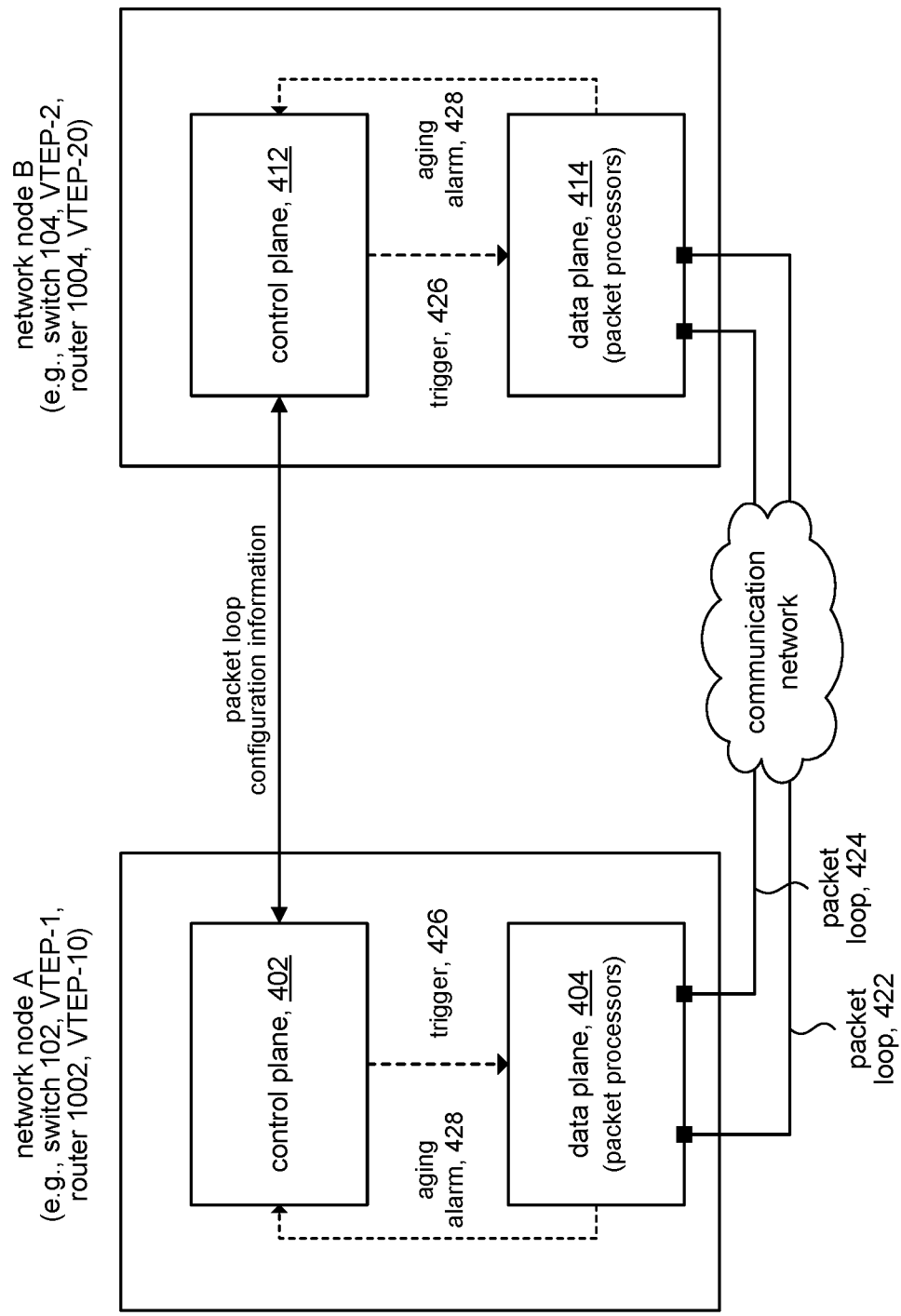
FIG. 4 illustrates processing between the control plane and the data plane in a network device in accordance with the present disclosure.
Figure 10:
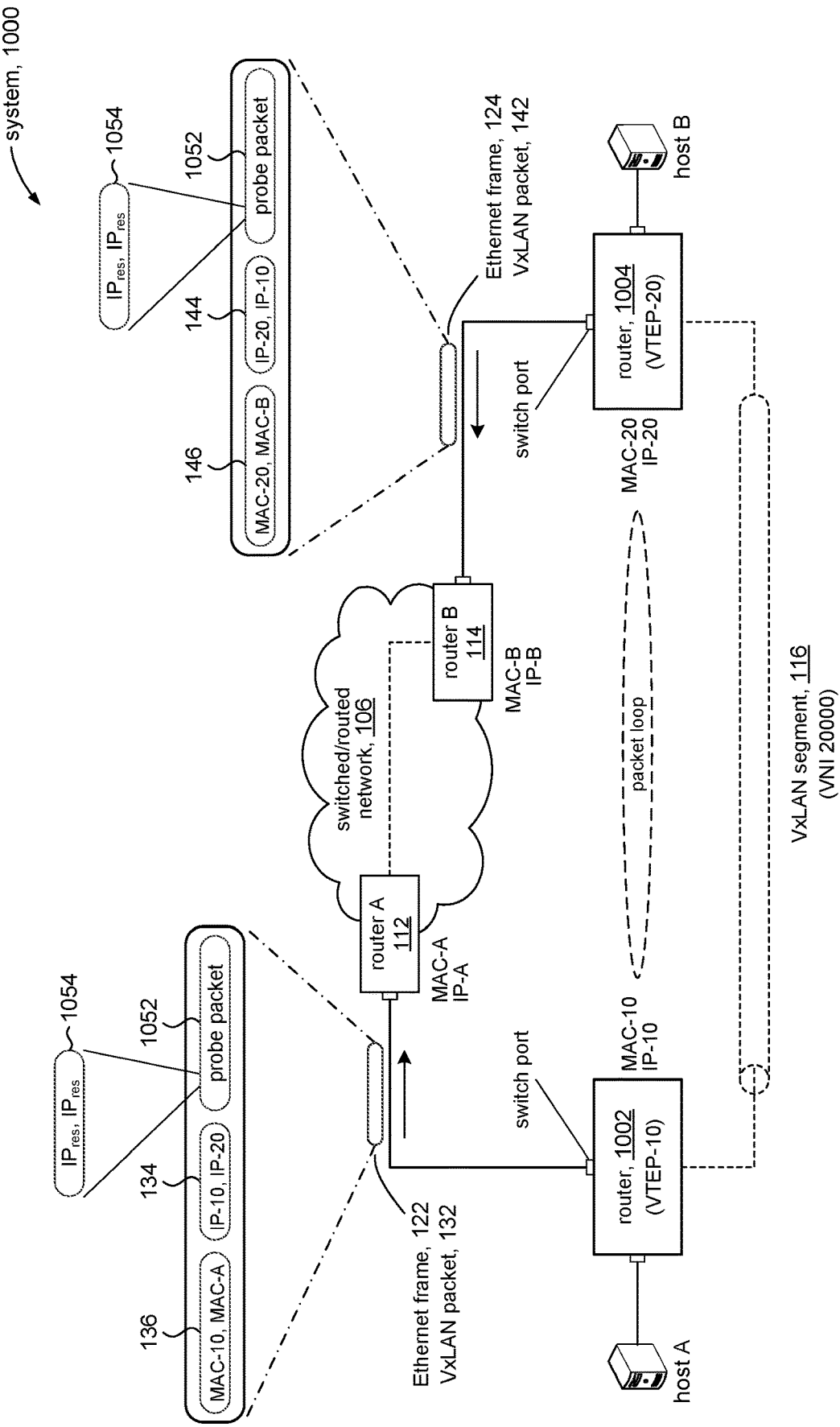
FIG. 10 shows a system adapted for packet loops in accordance with the present disclosure.

FIG. 4 is a schematic representation of two network nodes A, B configured in accordance with the present disclosure to run a packet loop between them. In some embodiments, for instance, network node A can be switch 102 and network node B can be switch 104 as shown in FIG. 1. In other embodiments, network node A can be a router 1002 and network node B can be a router 1004 as illustrated in FIG. 10. Either node can serve as an initiator to initiate a packet loop. For example, node A can initiate packet loop 422, node B can initiate packet loop 424. A packet loop runs between two endpoint nodes, and more specifically, a packet loop runs between a port on one endpoint node and a port on the other endpoint node. In accordance with the present disclosure, a packet loop is initiated and sustained by the respective data planes of the participating endpoint nodes. Setting up and subsequent management of packet loops, on the other hand, can be performed in the respective control planes of the endpoint nodes. For example, the control plane in the initiator node can set up a packet loop by synthesizing a probe packet and handing the probe packet off to the data plane (e.g., via a function call into the data plane or some other suitable trigger signal 426) which then initiates and sustains the packet loop. The control plane otherwise does not participate in sustaining the packet loop. The data plane in either node can signal its corresponding control plane (e.g., via a suitable aging alarm mechanism 428) to inform the control plane of a broken packet loop. These aspects of the present disclosure are discussed in more detail below.

In accordance with some embodiments of the present disclosure, network nodes that participate in a packet loop (e.g., network nodes A and B) can exchange configuration information relating to the performance of packet loops. In some embodiments, the configuration information can be negotiated by the network nodes participating in a packet loop; e.g., based on installed policies, device capability, and so on. In other embodiments, the configuration information can be installed by a system administrator. Packet loop configuration information can include parameters such as which device between two network devices is the probe initiator, aging timer timeout periods (FIGS. 9 and 15) for the aging mechanism 428, and the like. The packet loop configuration information can include identifiers or discriminators used to identify packet loop sessions. This allows the non-initiating endpoint device to know when it has received a probe packet, which can be useful for the aging mechanisms described in FIGS. 9 and 15.

Figure 5:
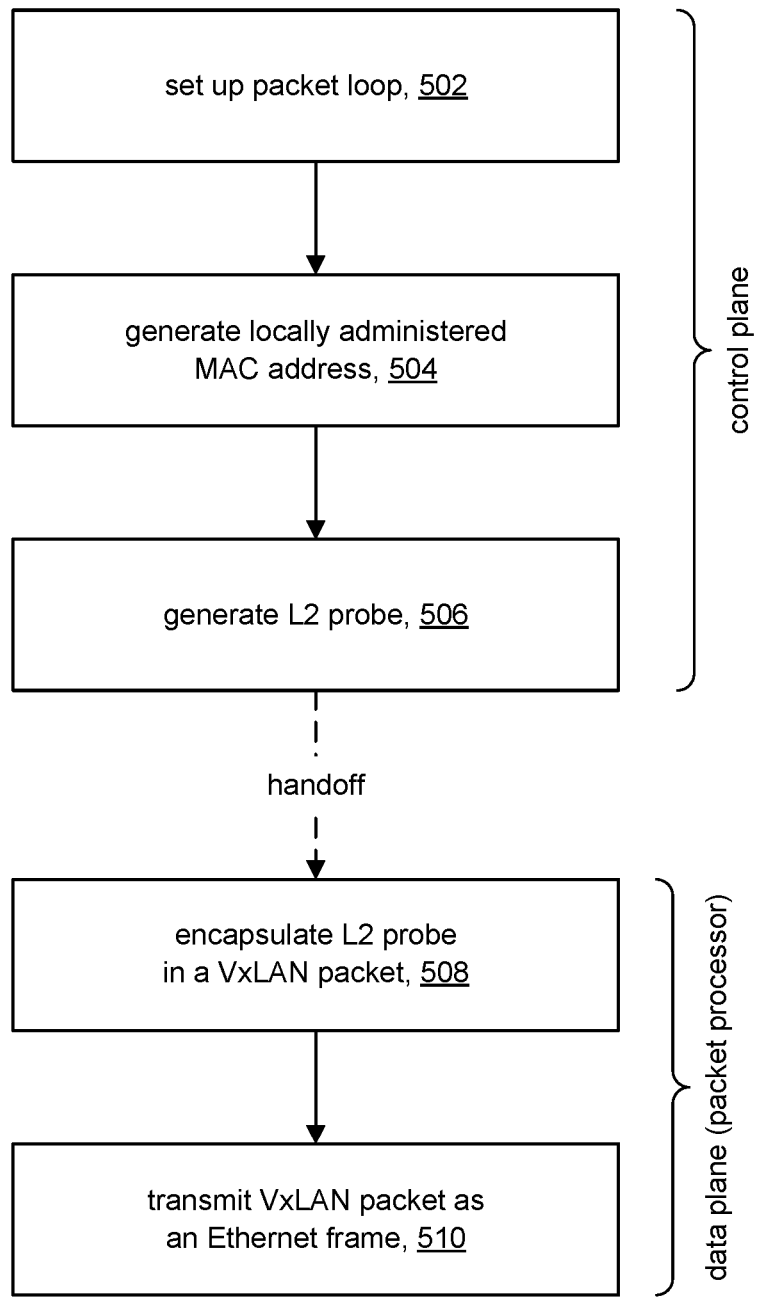
FIG. 5 illustrates processing in a network device to initiate a packet loop in accordance with the present disclosure.

Referring to FIG. 5 and other figures, the discussion will now turn to a high level description of processing in a network node (e.g., switch 102, 104, FIG. 1) to initiate a packet loop in accordance with the present disclosure. In accordance with the present disclosure, operations shown in FIG. 5 can be performed in the control plane of an initiator FIG. 5 to set up a packet loop, and by any packet processor (e.g., 312a, FIG. 3) in the data plane of the initiator to initiate the packet loop on any of its ports. Merely for discussion purposes, the following operations will be explained using switch 102 as an illustrative initiator of a packet loop. In some embodiments, a processor in the control plane and/or a packet processor in the data plane of the initiator switch can include control logic (e.g., program code, ASIC, FPGA, etc.) to operate the processor(s) in accordance with FIG. 5. The configuration shown in FIGS. 1 and 2A will be used to illustrate the discussion when needed.

At operation 502, the control plane of the initiating switch can set up a packet loop with a participating endpoint switch. In our example, for instance, the control plane in initiator switch 102 can set up a packet loop with participating switch 104. As explained above in FIG. 4, in accordance with some embodiments, the control plane of the initiator switch can synthesize and hand off a probe packet to the data plane to set up a packet loop, but does not otherwise participate in sustaining the packet loop.

At operation 504, the control plane can generate a locally administered MAC address in preparation for setting up a packet loop. As understood by persons of ordinary skill, there are generally two classes of MAC addresses: global (universal) and local. Global MAC addresses are administered by the Institute of Electrical and Electronics Engineers (IEEE) organization. Network device vendors are typically given a range of MAC Addresses that can be assigned to their products. These MAC addresses are sometimes referred to as globally unique MAC addresses, globally administered MAC addresses, and so on. By comparison, locally administered MAC addresses (or local MAC addresses) are not managed by the IEEE and are not associated with a vendor, but rather can be generated by an application (switch, host machine, etc.) on an as needed basis.

In accordance with some embodiments of the present disclosure, a local MAC address is associated with a packet loop. Since multiple packet loops can be initiated, a unique local MAC address can be defined for each packet loop. A MAC address is a six-octet value where the second-to-least significant bit of the first octet is used to distinguish between global and local MAC addresses. The bit is cleared ('0') for global MAC addresses (e.g., 00:31:C3:8E:A3:69, '00' being the first octet) and set ('1') for local MAC addresses (e.g., 02:00:00:00:04:D2, '02' being the first octet). A unique local MAC address can be generated in any suitable manner so long as the second-to-least significant bit of the first octet is set to '1'. In some embodiments, for example, the control plane can generate a value (session identifier, discriminator) that is used to generate a local MAC address; e.g., by OR'ing the session identifier with 0x020000000000. In some embodiments, the control plane may manage several packet loops (sessions) in a switch. The control plane can generate a unique session identifier to identify each such packet loop. This unique session identifier can be used to generate a corresponding unique local MAC address. Each such local MAC address can therefore uniquely identify a corresponding packet loop.

It is noted that in other embodiments in accordance with the present disclosure, the MAC address used for setting up a packet loop can be other than a locally administered MAC address. In some embodiments, for example, the MAC address can be a globally administered MAC address, a synthetic (virtual) MAC address, and in general can be any kind of MAC address. It will be appreciated, however, that in a typical environment, the MAC address should not overlap with the user address space; i.e., no application/user traffic will use the MAC address. It will be understood, therefore, that references to local MAC addresses made herein refer more generally to any suitable form of MAC address.

At operation 506, the control plane can generate (synthesize) a probe packet. In some embodiments, the probe packet can be an Ethernet frame. Accordingly, the probe packet can be referred to as an L2 (Layer 2) probe and the corresponding packet loop can be referred to as an L2 loop. In accordance with the present disclosure, the control plane can set the source MAC address and the destination MAC address of the L2 probe to have the same address. In some embodiments, for instance, that address can be the local MAC address obtained at operation 504. An example of an L2 probe is depicted in FIG. 2A as probe packet 152, where the inner source and destination MAC addresses 254a, 254b are set to the local MAC address LMAC. As will become clear, the content of the payload portion 202 in an L2 probe is not relevant for setting up an L2 loop. Accordingly, in some embodiments, the payload portion 202 of an L2 probe can contain any data that is suitable for a given embodiment of the present disclosure.

The control plane can handoff the synthesized L2 probe to the data plane. In some embodiments, the switch can include a handoff mechanism that makes handing off the L2 probe appear to the data plane as an ingress packet.

At operation 508, a packet processor in the data plane can encapsulate the received L2 probe in a VxLAN packet (e.g., 132 in FIG. 2A). In the context of VxLAN, the L2 probe can also be referred to as the "inner" Ethernet frame. In accordance with some embodiments, for example, the switch and in particular, the packet processors in the data plane of the switch, can be configured to provide VTEP functionality to support a VxLAN configuration, which in our example is VTEP-1. VTEP-1 can encapsulate the L2 probe in a VxLAN packet. As shown in FIG. 2A, the VxLAN header 204 specifies a 24-bit VNI. In some embodiments, the packet processor can use a predetermined reserved VNI that does not conflict with any VNI's defined in the system. In some embodiments, for example, the reserved VNI can be 0xFFFFFF, but more generally can be any suitable value that does not conflict with actual VNI's used in the system. In addition, since a VTEP maps between the system's VNI's and virtual local area networks (VLANs), a reserved VLAN can be defined that maps to the reserved VNI so as not to interfere with any actual VLANs defined by the system.

In our example, the VxLAN packet from switch 102 contains the following relevant information:

TABLE 1

| VxLAN packet (from switch 102) - starts the L2 loop | |
|---|---|
| outer source MAC | MAC-1 |
| outer destination MAC | MAC-A |
| outer source IP | IP-1 |
| outer destination IP | IP-2 |
| L2 probe | |
|     inner source MAC | LMAC |
|     inner destination MAC | LMAC | where the outer source MAC address is the MAC address of switch 102, namely MAC-1, and the destination MAC address is the MAC address of the next hop device, namely MAC-A of router 112. The outer source IP address is the IP address associated with VTEP-1 in switch 102 (i.e., IP-1) and the outer destination IP address is the IP address associated with VTEP-2 in switch 104 (i.e., IP-2).

For the initial L2 probe, LMAC as a destination MAC has not yet been learned in VTEP-1. Accordingly, in some embodiments, the default switch operation in VTEP-1 can be to flood the frame to all VTEPs in the flood list associated with the VLAN. When the destination switch (in our example, VTEP-2) responds, VTEP-1 can add the information to its MAC address table. In other embodiments, MAC learning can occur in the control plane of VTEP-1, for example, in accordance with the Ethernet Virtual Private Network (EVPN) model.

At operation 510, the packet processor can transmit the VxLAN packet as an Ethernet frame to the participating endpoint switch, thus initiating an L2 loop between the initiator switch and the participating switch. In our example, this represents the initial injection of the L2 probe into the L2 loop between switches 102 and 104.

Figure 6:
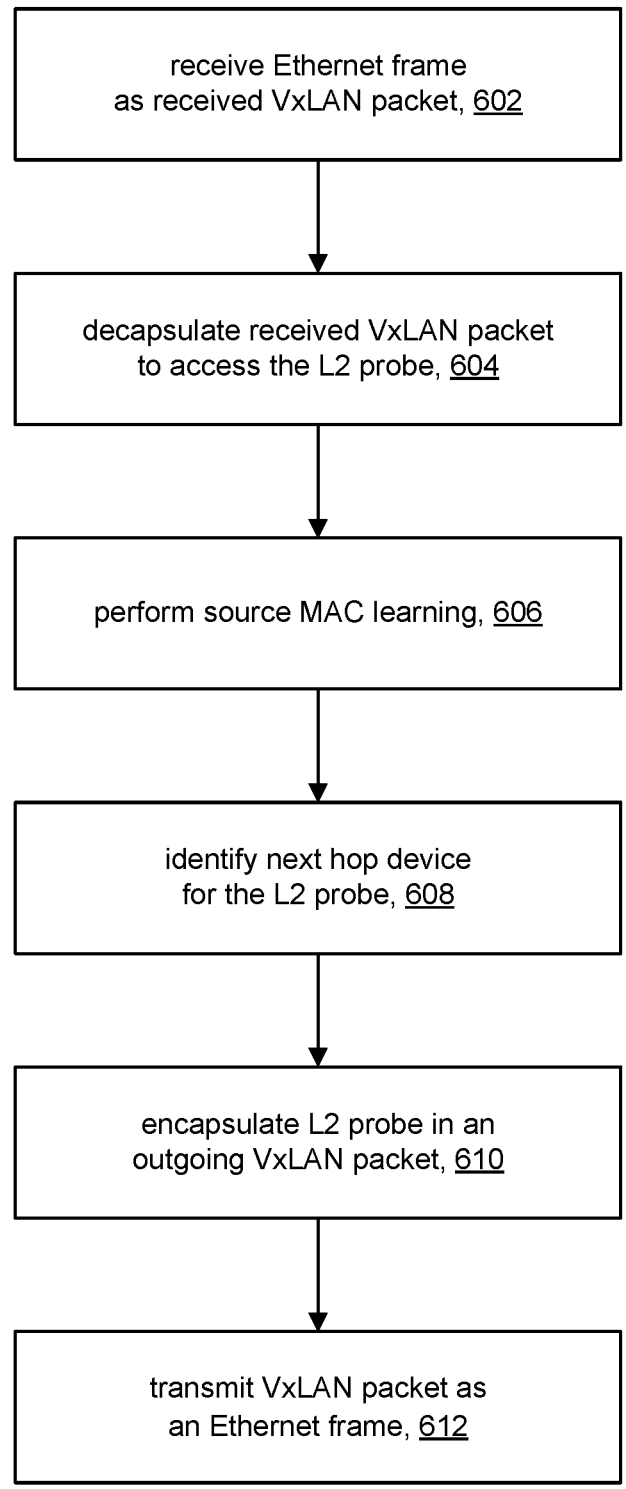
FIG. 6 illustrates processing in a network device to sustain a packet loop in accordance with the present disclosure.

The discussion will now continue with FIG. 6 to describe operations for processing a received L2 probe to sustain an L2 loop in accordance with the present disclosure, where the L2 probe is continuously forwarded between the initiating switch and the participating endpoint switch, which in our example are switches 102 and 104, respectively. In accordance with the present disclosure, it is understood that the following operations are performed by respective packet processors in both switches in order to sustain an L2 loop. For discussion purposes, however, the operations will be explained from the point of view of the participating endpoint switch (e.g., switch 104) that receives the initiating L2 probe. In some embodiments, a packet processor (e.g., 312a, FIG. 3) in the data plane of the switch can comprise control logic (e.g., ASIC, FPGA) configured to operate in accordance with FIG. 6. Notably, in accordance with the present disclosure, the control plane of the switch does not participate in the operations of FIG. 6.

At operation 602, a packet processor in the participating switch can receive the Ethernet frame from the initiating switch as a received VXLAN packet. In our example, the Ethernet frame is routed from switch 102 to switch 104 which receives the Ethernet frame as an incoming VxLAN packet containing the following information:

TABLE 2

| VxLAN packet (received at switch 104) | |
|---|---|
| outer source MAC | MAC-B |
| outer destination MAC | MAC-2 |
| outer source IP | IP-1 |
| outer destination IP | IP-2 |
| L2 probe | |
|     inner source MAC | LMAC |
|     inner destination MAC | LMAC |

At operation 604, the packet processor can decapsulate the received VxLAN packet to access the L2 probe. FIG. 2A, for example, illustrates the encapsulation of probe packet 152 in VxLAN packet 132. In some embodiments, for example, the decapsulation can be performed by the VTEP functionality of the packet processor, which in our example is VTEP-2.

At operation 606, the packet processor can perform source MAC learning on the received VxLAN packet. Generally, when the packet processor receives an Ethernet frame, the packet processor associates the source MAC address of the device that sent the Ethernet frame (source device) with the interface (i.e., switch port) on which that Ethernet frame was received. The table that stores these associations is known as the MAC address table (MAC table, forwarding table, etc.). The process is generally referred to as source MAC learning, and typically occurs in the data plane. In some embodiments, MAC learning can take place in the control plane; e.g., Ethernet Virtual Private Network (EVPN).

The MAC table is used to determine which interface to send a subsequent outgoing Ethernet frame. For example, the packet processor can use the destination MAC address contained in the outgoing Ethernet frame as a key into the MAC address table to identify the interface on which to transmit that outgoing Ethernet frame.

In a VxLAN, a similar learning process is performed on the inner Ethernet frame by the VTEP functionality executing on the packet processor, where the "interface" is the source VTEP. Source MAC learning in the context of a VxLAN packet maps the inner Ethernet frame that is encapsulated in the VxLAN packet to the VTEP that sent the VxLAN packet. Accordingly, source MAC learning for a VxLAN packet includes associating the inner source MAC address contained in the inner Ethernet frame with the outer source IP address of the VTEP that sent the VxLAN packet, and storing that association in the MAC address table. In our example, the inner Ethernet frame is the L2 probe (probe packet 152, FIG. 2A) and the sending VTEP is VTEP-1 in switch 102. Accordingly, source MAC learning on the received inner Ethernet frame maps the MAC address LMAC (inner source MAC address of the L2 probe) to IP-1 (outer source IP address of VTEP-1).

For a subsequent outgoing Ethernet frame in a VxLAN, the packet processor will use the destination MAC address contained in that (inner) Ethernet frame as a key into the MAC address table to identify the destination VTEP for sending a VLXAN packet that encapsulates the outgoing inner Ethernet frame.

At operation 608, the packet processor can identify the next hop device for the L2 probe. By operation of VTEP-2 executing in a packet processor of switch 104, the packet processor will perform a lookup in the MAC table on the destination MAC address of the inner Ethernet frame to identify the interface on which to forward that inner Ethernet frame. For regular network traffic, for example, the next hop device would be the host connected to switch 104 (e.g., host B, FIG. 1), and the destination MAC address would be the address of that host (e.g., the MAC address of host B). The MAC table would identify the interface on switch 104 that host is connected to. In accordance with the present disclosure, the inner Ethernet frame is the L2 probe having a destination MAC address LMAC. In our example, the source MAC learning operation at 606 associated the MAC address LMAC with a destination VTEP as the interface having an IP address of IP-1, which is VTEP-1 in switch 102 (next hop device).

At operation 610, the packet processor can encapsulate the L2 probe in an outgoing VxLAN packet, since the next hop device determined at operation 608 is a VTEP. The header portion (e.g., 212) of the outgoing VxLAN packet specifies the destination IP address, which in our example is IP-1 from the MAC table lookup performed in operation 608. The source IP address in the header portion of the outgoing VxLAN packet is IP-2, which is the IP address associated with VTEP-2 in switch 104.

In our example, the outgoing VxLAN packet from switch 104 contains the following relevant information:

TABLE 3

| VxLAN packet (from switch 104) | |
|---|---|
| outer source MAC | MAC-2 |
| outer destination MAC | MAC-B |
| outer source IP | IP-2 |
| outer destination IP | IP-1 |
| L2 probe | |
|     inner source MAC | LMAC |
|     inner destination MAC | LMAC | where the outer source MAC address is the MAC address of switch 103, namely MAC-2, and the destination MAC address is the MAC address of the next hop device, namely MAC-B of router 114. The outer source IP address is the IP address associated with VTEP-2 in switch 104 (i.e., IP-2) and the outer destination IP address is the IP address associated with VTEP-1 in switch 102 (i.e., IP-1).

At operation 612, the packet processor can transmit the outgoing VxLAN packet as an Ethernet frame, thus returning the same L2 probe back to switch 102.

FIG. 5 described operations in switch 102 (FIG. 5) to send an L2 probe to initiate a packet loop. FIG. 6 described operations in switch 104 (FIG. 6) to process a received L2 probe. The discussion will now turn to a description of how the packet loop can be sustained between switch 102 and 104 in accordance with the present disclosure.

When the VxLAN packet is routed from switch 104 to switch 102, the packet processor in switch 102 will process the received VxLAN packet (TABLE 4) according to FIG. 6. Of particular note, at operation 606, source MAC learning on a MAC table in switch 102 will associate the source MAC address in the encapsulated L2 probe, namely LMAC, with the source IP address of the sending VTEP-2, namely IP-2.

TABLE 4

| VxLAN packet (received at switch 102) | |
|---|---|
| outer source MAC | MAC-A |
| outer destination MAC | MAC-1 |
| outer source IP | IP-2 |
| outer destination IP | IP-1 |
| L2 probe | |
|     inner source MAC | LMAC |
|     inner destination MAC | LMAC |

At operation 608, a MAC table lookup on the L2 probe's destination MAC address LMAC will identify IP-2 as the next hop device, which is the IP address of VTEP-2 in switch 104. At operation 610, the packet processor will generate a VxLAN packet that contains the following relevant information which will forward the L2 probe back to switch 104:

TABLE 5

| VxLAN packet (from switch 102) | |
|---|---|
| outer source MAC | MAC-1 |
| outer destination MAC | MAC-A |
| outer source IP | IP-1 |
| outer destination IP | IP-2 |
| L2 probe | |
|     inner source MAC | LMAC |
|     inner destination MAC | LMAC |

The VxLAN packet represented in TABLE 5 contains the same information as the VxLAN packet represented in TABLE 1, which was the VxLAN packet sent by switch 102 to initiate the L2 loop (operation 510).

When switch 104 receives the VxLAN packet from switch 102, switch 104 will process the received VxLAN packet according to FIG. 6, and respond by forwarding the same L2 probe back to switch 102 in a VxLAN packet configured according to TABLE 3. Switch 102, in turn, will respond (per FIG. 6) by forwarding the same L2 probe back to switch 104 in a VxLAN packet configured according to TABLE 5, and so on so that the L2 probe is continuously forwarded between switch 102 and switch 104 in an L2 loop. The L2 loop is sustained by virtue of setting the inner source and destination MAC addresses in the L2 probe to be the same so that each switch learns the same MAC address but points to the other switch as the next hop device.

As explained, setting the inner source and destination MAC addresses in the L2 probe and encapsulating the L2 probe allows for the L2 loop to be sustained. It is noted that by encapsulating the L2 probe, an L2 loop can span multiple hops. FIG. 1 is illustrative. An L2 loop between switch 102 and switch 104 spans two hops (router A and router B), and maybe more depending on the number of hops between router A and router B.

By comparison, a conventional BFD Echo probe packet is set up by setting the source IP (SIP) address equal to the destination IP (DIP) address. When an initiating device X (for example, router A in FIG. 1) generates BFD Echo probe packet and sends it to a participating device Y (for example, router B in FIG. 1), the participating device Y simply "reflects" the probe packets back to the initiating device X. The probe packet cannot get beyond the participating device Y since the SIP and DIP address both refer to the initiating device X. The participating device Y has no option but to reflect the probe packet back to the initiating device X because the next-hop in the routing table points to device X for the given DIP address. Fundamentally, conventional BFD Echo does not work for multi-hop cases.

Figure 7:
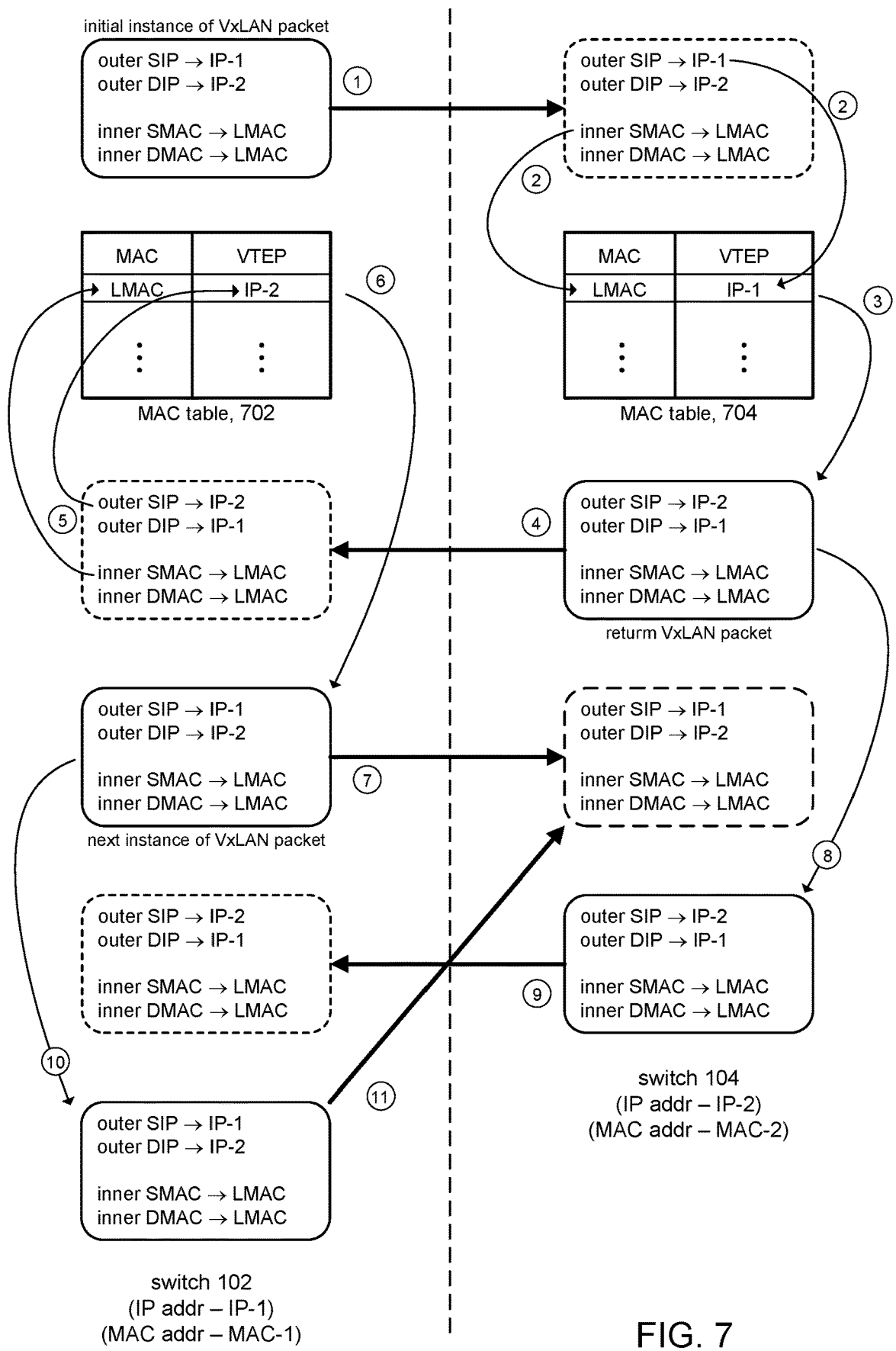
FIG. 7 illustrates packet flows in a packet loop in accordance with the present disclosure.

Refer now to FIG. 7 for a graphical illustration of packet forwarding between switches 102, 104 in accordance with the present disclosure. The sequence of packet exchanges are identified by time indices that are shown in FIG. 7 as circled numbers. The following description refers to operations performed by switches 102, 104. More specifically, the operations are performed by the VTEP functionalities executing in the data planes of the respective switches 102, 104; e.g., the VTEP functionality VTEP-1 executing in the data plane of switch 102 and the VTEP functionality VTEP-2 executing in the data plane of switch 104.

At time index '1', switch 102 sends an initial instance of a VxLAN packet that encapsulates an L2 probe (i.e., an inner Ethernet frame) to switch 104. The relevant information from the VxLAN packet is shown in FIG. 7. For example, the outer SIP and outer DIP refer, respectively, to the source and destination IP addresses in the header portion (e.g., 212, FIG. 2A) of the VxLAN packet. The inner SMAC and inner DMAC refer, respectively, to the source and destination MAC addresses in the L2 probe, which are both set to the same local MAC address, namely LMAC.

At time index '2', switch 104 will perform source MAC learning on the received VxLAN packet, as explained in operation 606 in FIG. 6 for example. Accordingly, switch 104 will learn that L2 probe source MAC address LMAC is associated with IP address IP-1, the IP address of the VTEP, namely VTEP-1, that send the VxLAN packet. As shown in FIG. 7, a suitable entry is made in MAC table 704 of switch 104.

At time index '3', switch 104 will determine the next hop device that the L2 probe needs to be forwarded to. Using the destination MAC address in the L2 probe (i.e., LMAC) to do a table lookup in the MAC table 704, switch 104 will determine the next hop device to be IP-1. Switch 104 will encapsulate the L2 probe in a return VxLAN packet for the next hop.

At time index '4', switch 104 will forward the return VxLAN packet to switch 102.

At time index '5', switch 102 will perform source MAC learning on the return VxLAN packet received from switch 104. Accordingly, switch 102 will learn that the L2 probe source MAC address LMAC is associated with IP address IP-2, the IP address of the VTEP, namely VTEP-2, that send the VxLAN packet. As shown in FIG. 7, a suitable entry is made in MAC table 702 of switch 102.

At time index '6', switch 102 will determine the next hop device to forward the L2 probe. Using the destination MAC address in the L2 probe (i.e., LMAC) to do a table lookup in the MAC table 702, switch 102 will determine the next hop device to be IP-2. Switch 102 will encapsulate the L2 probe in another instance of VxLAN packet for the next hop.

At time index '7', switch 102 will forward the VxLAN packet to switch 104.

When switch 104 receives the VxLAN packet from switch 102 at time index '7', source MAC learning in switch 104 may be skipped because the inner source MAC address in the L2 probe has already been learned in MAC table 704. Accordingly, at time index '8' switch 104 encapsulates the L2 probe in another instance of the VxLAN packet that it had generated at time index '4'.

At time index '9', switch 104 will forward the VxLAN packet to switch 102.

When switch 102 receives the VxLAN packet from switch 104 at time index '9', source MAC learning in switch 102 is skipped because the inner source MAC address in the L2 probe has already been learned in MAC table 702. Accordingly, at time index '10' switch 102 encapsulates the L2 probe in another instance of the VxLAN packet that it had generated at time index '7'.

At time index '11', switch 102 will transmit the VxLAN packet to switch 104. At this point, it can be seen that the forwarding operations will repeat the sequence identified by time indices '8', '9', '10', and '11', thus sustaining an L2 loop of the L2 probe between switches 102 and 104.

Figure 8:
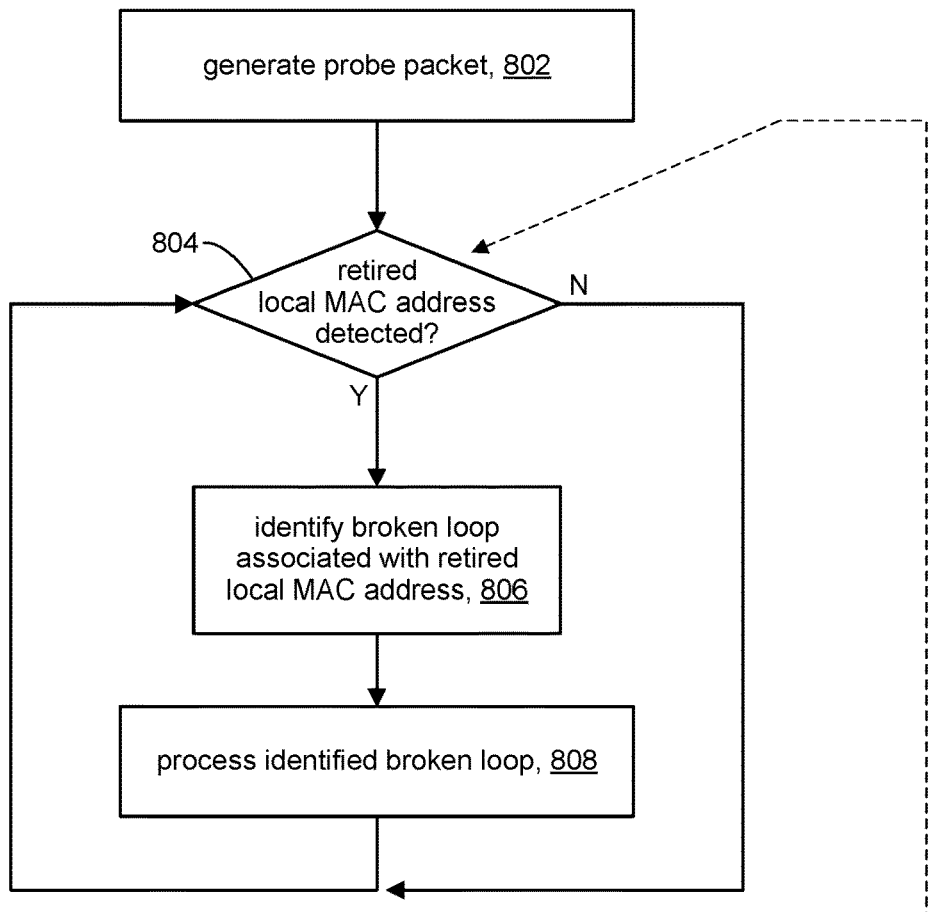
FIG. 8 illustrates processing in the control plane of a network device in accordance with the present disclosure.
Figure 9:
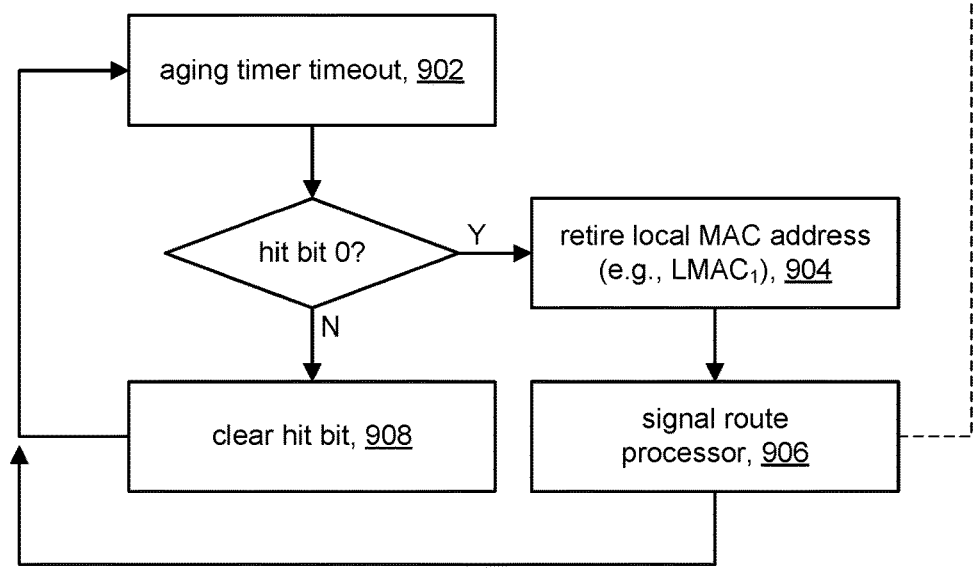
FIG. 9 illustrates an aging mechanism in accordance with the present disclosure.

Referring to FIGS. 8 and 9, the discussion will now turn to a description of processing in a switch (e.g., switch 102, 104, FIG. 1) to set up and manage or otherwise administer L2 loops in accordance with the present disclosure. One or more L2 loops can run between two endpoint switches (switches 102, 104). In some embodiments, for example, processes executing in the respective control planes (e.g., FIG. 3) of the two endpoint switches can provide management of those L2 loops. For discussion purposes, however, the following operations will be explained from the point of view of one of the endpoint switches (e.g., 102) with the understanding that the other switch (e.g., 104) participating in the L2 loop can perform the same operations in its control plane. In some embodiments, switch 102 can include computer executable program code, which when executed by a route processor (e.g., 308) in the control plane of the switch, can cause the processor to operate in accordance with FIGS. 8 and 9.

At operation 802, the control plane in an endpoint switch that is the initiator can generate a probe packet that can be handed off to the data plane (e.g., FIG. 5) to initiate an L2 loop in accordance with the present disclosure. In some embodiments, for example, the control plane may be able to communicate with the data plane via an application programming interface (API). Accordingly, the control plane can invoke a suitable API to handoff the probe packet to the data plane. In other embodiments, the control plane can use other suitable triggering mechanisms.

In some embodiments, the control plane in the initiator can manage several active L2 loops. Unique identifiers (session ID's) can be used to track the active L2 loops. When the control plane sets up a new L2 loop, it can assign a new session ID for the L2 loop. This unique session ID can then be used by the control plane to generate a unique local MAC address for the L2 probe (e.g., operation 506 in FIG. 5); e.g., the session ID can be incorporated as part of the local MAC address. The L2 probe can then be handed off to the data plane to initiate the L2 loop; the control plane does not otherwise participate in the mechanics of initiating the L2 loop (which takes place in the data plane, e.g., per FIG. 5), or in sustaining the L2 loop once initiated (which takes place in the data plane, e.g., per FIG. 6).

Operation 802 applies to the endpoint switch that is the initiator of the packet loop. The remaining description of FIG. 8 applies both endpoint switches, irrespective of whether the endpoint switch is the initiator of the packet loop or not.

At operation 804, the control plane can detect the occurrence of retired local MAC addresses. In some embodiments, an aging mechanism can be used to retire local MAC addresses. In some embodiments, for example, the aging mechanism can be based on hit bits, where each entry in the MAC table having a local MAC address is associated with a hit bit. Each time the packet processor receives a probe packet, a lookup in the MAC table is made and the hit bit associated with the entry that matches the local MAC address can be set (e.g., logic '1'). Similarly, if the local MAC address is not already in the MAC table, then a new MAC entry is added (source MAC learning) and the hit bit associated with that new entry can be set.

Referring for a moment to FIG. 9, in some embodiments, the aging mechanism can include a process that uses an aging timer to periodically inspect the hit bits associated with local MAC addresses. In some embodiments, for example, the timeout period of the aging timer can be programmable/configurable and can range from milliseconds to fractions of a millisecond. When the aging timer times out at 902, the aging process can check or otherwise inspect the hit bits of entries in the MAC table that contain local MAC addresses. The initiating endpoint switch will know which MAC addresses belong to probe packets by virtue of having generated the probe packets. The non-initiating endpoint switch can know which MAC addresses belong to probe packets based on packet loop configuration information negotiated or otherwise installed between the two endpoint switches as discussed in FIG. 4 above.

At operation 904, if the hit bit is cleared, the associated entry can be retired; e.g., by marking the MAC entry as being unused. As explained above, the hit bit associated with an entry is set each time a lookup on that entry is made; i.e., when the entry is accessed. If the hit bit is cleared, that indicates a lookup on the entry had not occurred during the aging timer timeout period and so the entry can be deemed to be old and hence can be "retired" from the MAC table to make the entry available for source MAC learning.

At 906, the aging process can signal the route processor in the control plane using any suitable aging alarm (e.g., 428) to inform the control plane that the local MAC address of a MAC table entry identified in operation 904 has been retired. For example, the aging process can make an API call to the control plane, or assert an interrupt, and so on. Processing can return to 902 for another loop.

If the hit bit in a MAC entry is set, then the aging process will simply clear the bit (e.g., logic '0') at 908 and processing can return to 902 for the next loop. As explained above, the hit bit is set each time a lookup on the entry is made. If the entry is active, then the hit bit will be re-set to logic '1' on the next lookup before the aging timer timeout period expires in the next loop. An entry is therefore deemed "active" if a lookup on the entry is made within the timeout period.

Returning to FIG. 8, in the case of an L2 probe running in an L2 loop, each time the switch (e.g., switch 102) receives the L2 probe, the packet processor processing the L2 probe will do a MAC table look up on the local MAC address contained in the L2 probe, and set the associated hit bit. Thus, so long as the data path remains up, the hit bit associated with the local MAC address will always be set by the packet processer even though the aging process periodically clears it per operation 908 in FIG. 9. However, a fault can occur in the data path between the two switches where the L2 loop breaks and L2 probes are no longer forwarded between the two switches. When the hit bit is cleared by the aging process at 908, the hit bit will not be subsequently re-set back to logic '1' by the packet processor. When the aging process sees a cleared bit, the aging process will retire the local MAC address (operation 904) and signal the control plane of the occurrence of a retired local MAC address (e.g., $LMAC_1$).

At operation 806, the control plane can process a retired local MAC address. In some embodiments, for example, when the aging process retires a local MAC address, the aging process can communicate the retired local MAC address to the control plane. In some embodiments, the control plane can inspect the local MAC address for the occurrence for the session ID that identifies an L2 loop from among several L2 loops triggered by the control plane (e.g., operation 802). Since the local MAC address has been retired (aged out), that indicates the identified L2 loop is broken and hence the occurrence of a path fault between the endpoint switches of the identified L2 loop.

At operation 808, the control plane can process the identified broken L2 loop. In some embodiments, for example, the control plane can initiate a convergence sequence in order to identify an alternative path between the endpoint switches. In some embodiments, the control plane can throw an alarm to signal a user (e.g., network administrator) of the downed port.

Recall that the operations of FIG. 8 can be performed in the control planes of both participating switches, and so the retired LMAC address can be detected by both switches. Accordingly, either or both of the switches can handle the detection of a broken by declaring the link down and triggering various actions.

The foregoing has described the forwarding of an L2 probe in an L2 loop between network nodes that are configured as L3 (Layer 3) switches (e.g., switches 102, 104), which combine the functionality of a switch and a router.

In some embodiments of the present disclosure, the network nodes can be routers, which are commonly understood to be Layer 3 devices. Accordingly, a packet loop that runs between two endpoint routers can be referred to as a Layer 3 loop or an L3 loop. The probe packet that is forwarded in an L3 loop can referred to as an L3 probe. This aspect of the present disclosure will now be described.

FIG. 10 shows a system level diagram for detecting a path failure in a networked system 1000 in accordance with some embodiments of the present disclosure. Elements originally shown in FIG. 1 are described above in connection with FIG. 1.

System 1000 includes routers 1002 and 1004 (e.g., FIG. 3). In some embodiments, routers 1002, 1004 can each be configured as VxLAN tunnel endpoints (VTEPs). Thus, router 1002 can be configured to provide functionality for VTEP-10 and router 1004 can be configured to provide functionality for VTEP-20. VTEP-10 and VTEP-20 support communication between respective routers 1002, 1004 over a VxLAN tunnel, which is logically depicted in FIG. 10 as VxLAN tunnel (segment) 116 and identified by a VxLAN network identifier (VNI) 20000. Router 1002 is associated with a MAC address MAC-10 and an IP address IP-10, which serves as the IP address of VTEP-10. Likewise, router 1004 is associated with a MAC address MAC-20 and an IP address IP-20 (the IP address of VTEP-2).

In accordance with the present disclosure, routers 1002 and 1004 can be configured to monitor a data path between the two routers over a VxLAN tunnel. In some embodiments, a probe packet 1052 can be transmitted back and forth between routers 1002 and 1004 in a packet forwarding loop (packet loop). In accordance with some embodiments of the present disclosure, the probe packet 1052 can be contained in an inner Ethernet frame that in turn is encapsulated in a VxLAN packet. The probe packet 1052 can include an inner IP address pair 1054 comprising an inner source IP address and an inner destination IP address. In accordance with the present disclosure, the inner source IP address and inner destination IP address can be set equal to each other. FIG. 10, for example, shows that the inner source and destination IP addresses of probe packet 1052 are both set to a reserved IP address represented symbolically as (Pres. This aspect of the present disclosure is discussed in more detail below.

Router 1002 can send probe packet 1052 to router 1004 over a VxLAN. The probe packet 1052 can be encapsulated in VxLAN packet 132. The VxLAN packet 132 can include an outer IP address pair 134 comprising an outer source IP address and an outer destination IP address. In the example depicted in FIG. 10, for instance, the outer source IP address is set to the IP address of VTEP-10, namely IP-10, and the outer destination IP address is set to the IP address of VTEP-20, namely IP-20. The VxLAN packet 132 can include an outer MAC address pair 136 comprising an outer source MAC address and an outer destination MAC address, which in the example of FIG. 10, are MAC-10 and MAC-A respectively. Router 1002 can transmit VxLAN packet 132 to router 1004. Additional details for VxLAN packet 132 are shown in FIG. 11A.

When router 1004 receives VxLAN packet 132, router 1004 can forward the same probe packet 1052 back to router 1002. The probe packet 1052 can be encapsulated in VxLAN packet 142. The VxLAN packet 142 can include an outer IP address pair 144 comprising an outer source IP address and an outer destination IP address. In the example depicted in FIG. 10, for instance, the outer source IP address is set to the IP address of VTEP-20, namely IP-20, and the outer destination IP address is set to the IP address of VTEP-10, namely IP-10. The VxLAN packet 142 can include an outer MAC address pair 146 comprising an outer source MAC address and an outer destination MAC address, which in the context of FIG. 10, are MAC-20 and MAC-B respectively. Router 1004 can transmit VxLAN packet 142 to router 1002. Additional details for VxLAN packet 142 are shown in FIG. 11B.

FIGS. 11A and 11B are simplified representations of VxLAN packets 132, 142 depicted in FIG. 10, showing additional details for forwarding the probe packet 1052 between routers 1002, 1004 in accordance with some embodiments. VxLAN packet 132 shown in FIG. 11A, for instance, is sent from router 1002 to router 1004. VxLAN packet 132 encapsulates inner Ethernet frame 1102. In accordance with some embodiments, the probe packet 1052 constitutes the payload portion of inner Ethernet frame 1102. The inner Ethernet frame 1102 includes an inner Ethernet header that identifies the MAC address of the sending router 1002 as source MAC address (MAC10) and the MAC address of the destination router 1004 as the destination MAC address (MAC20).

Likewise, VxLAN packet 142 shown in FIG. 11B is sent from router 1004 to router 1004. VxLAN packet 142 encapsulates inner Ethernet frame 1104. In accordance with some embodiments, the probe packet 1052 constitutes the payload portion of inner Ethernet frame 1104. The inner Ethernet frame 1104 includes an inner Ethernet header that identifies the MAC address of the sending router 1004 as source MAC address (MAC20) and the MAC address of the destination router 1002 as the destination MAC address (MAC10).

In some embodiments, the probe packet 1052 is an IP packet. The IP packet format includes source and destination IP address fields 1054 and a time to live (TTL) value 1106, among other data fields. This aspect of the present disclosure is discussed below.

Figure 12:
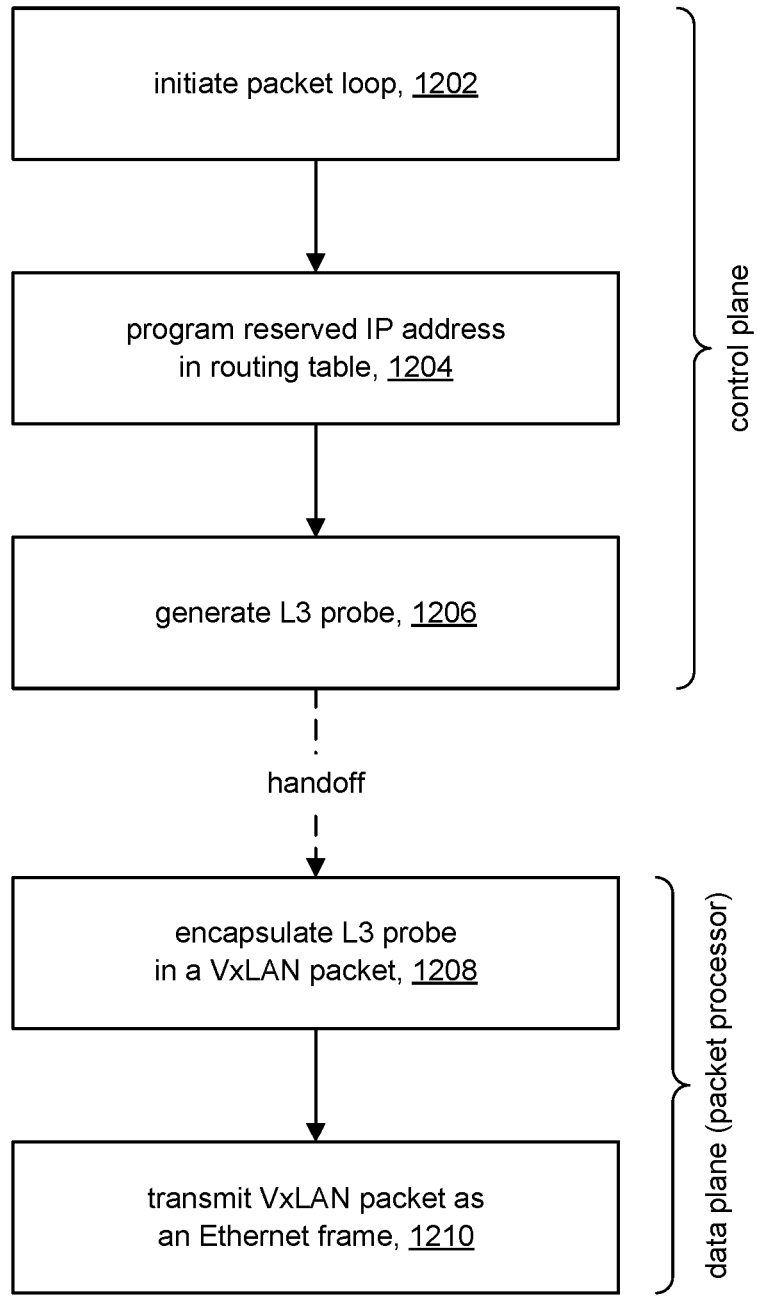
FIG. 12 illustrates processing in a network device to initiate a packet loop in accordance with the present disclosure.

Referring to FIG. 12 and other figures, the discussion will now turn to a high level description of processing in a network node (e.g., router 1002, 1004) to initiate a packet loop in accordance with the present disclosure. In accordance with the present disclosure, operations shown in FIG. 12 in the control plane of an initiator to set up a packet loop, and by any packet processor (e.g., 312a, FIG. 3) in the data plane of the initiating router to initiate a packet loop. Merely for discussion purposes, the following operations will be explained using router 1002 as an illustrative initiator of a packet loop. In some embodiments, a processor in the control plane and/or a packet processor in the data plane of the initiating router can include control logic (e.g., program code, ASIC, FPGA, etc.) to operate the processor(s) in accordance with FIG. 12. The configuration shown in FIGS. 10 and 11A will be used to illustrate the discussion when needed.

At operation 1202, the control plane in the initiating router can set up a packet loop with a participating endpoint router. In our example, for instance, the control plane in initiating router 1002 can set up a packet loop with participating router 1004. As explained above in FIG. 4, in accordance with some embodiments, the control plane of the initiating router can synthesize and hand off a probe packet to the data plane to set up a packet loop, but does not otherwise participate in sustaining the packet loop.

At operation 1204, the control plane can access a predetermined reserved IP address, $IP_{res}$. In some embodiments, for example, the control plane can program the reserved IP address as a host route (e.g., IP/32 with IPv4 or IP/128 with IPv6) in the router's routing table with the next-hop pointing at the participating router (remote VTEP). In some embodiments, the control plane may manage several packet loops. The control plane can program several predetermined reserved IP addresses in the routing table to uniquely identify corresponding packet loops. In some embodiments in accordance with the present disclosure, reserved IP addresses can be selected from a reserved range of IP addresses that are not used in the system so as to avoid interfering with traffic in the system. It is noted, however, that in other embodiments, the predetermined IP address is not necessarily selected from a reserved range of IP addresses. In general, the predetermined IP address can be any kind of IP address, including valid IP addresses, synthetic (virtual) IP addresses, and so on. It will be appreciated, however, that in a typical environment, the predetermined IP address should not overlap with the user address space, i.e., no application/user traffic will use the IP address, so as to avoid interfering with actual traffic. It will be understood, therefore, that references to a reserved IP address $IP_{res}$ made herein refer more generally to any suitable form of reserved IP address.

At operation 1206, the control plane can generate a probe packet. In some embodiments, the probe packet can be an IP packet, and in this context the probe packet can be referred to as an "L3 probe." An example of an L3 probe is depicted in FIG. 11A as probe packet 1052 comprising an inner IP header portion and a payload portion, where the inner source and destination IP addresses 1054 in the IP header portion are set to the reserved IP address obtained at operation 1204. As will become clear later on, the content of the payload portion of the L3 probe does not affect the packet loop. Accordingly, in some embodiments, the payload portion of an L3 probe can contain any data that is suitable for a given embodiment of the present disclosure.

The control plane can hand off the synthesized L3 probe to the data plane. In some embodiments, the switch can include a handoff mechanism that makes handing off the L3 probe appear to the data plane as an ingress packet.

At operation 1208, a packet processor in the data plane can encapsulate the L3 probe in a VxLAN packet. In some embodiments, the L3 probe can be encapsulated in an inner Ethernet frame, which in turn can then be encapsulated in a VxLAN packet, as shown in FIG. 11A for example. In our example, the VxLAN packet from router 1002 contains the following relevant information:

TABLE 6

| VxLAN packet (from router 1002) - starts the L3 loop | |
|---|---|
| outer source MAC | MAC-10 |
| outer destination MAC | MAC-A |
| outer source IP | IP-10 |
| outer destination IP | IP-20 |
| inner Ethernet frame | |
|    inner source MAC | MAC-10 |
|    inner destination MAC | MAC-20 |
|    L3 probe | |
|       inner source IP | $IP_{res}$ |
|       inner destination IP | $IP_{res}$ | where the outer source MAC address is the MAC address of router 1002, namely MAC-10, and the destination MAC address is the MAC address of router 112, namely MAC-A. The outer source IP address is the IP address associated with VTEP-10 in router 1002 (i.e., IP-10) and the outer destination IP address is the IP address associated with VTEP-20 in router 1004 (i.e., IP-20). The source and destination MAC addresses of the inner Ethernet frame reference the source and destination routers, namely MAC-10 and MAC-20, respectively. The inner source and destination IP addresses in the L3 probe are set to the same reserved IP address ($IP_{res}$), in accordance with the present disclosure.

At operation 1210, the packet processor can transmit the VxLAN packet as an Ethernet frame to the participating endpoint router, thus initiating a packet loop between the initiating router and participating router. In our example, this represents the initial injection of the L3 probe into the L3 loop between routers 1002 and 1004.

Figure 13:
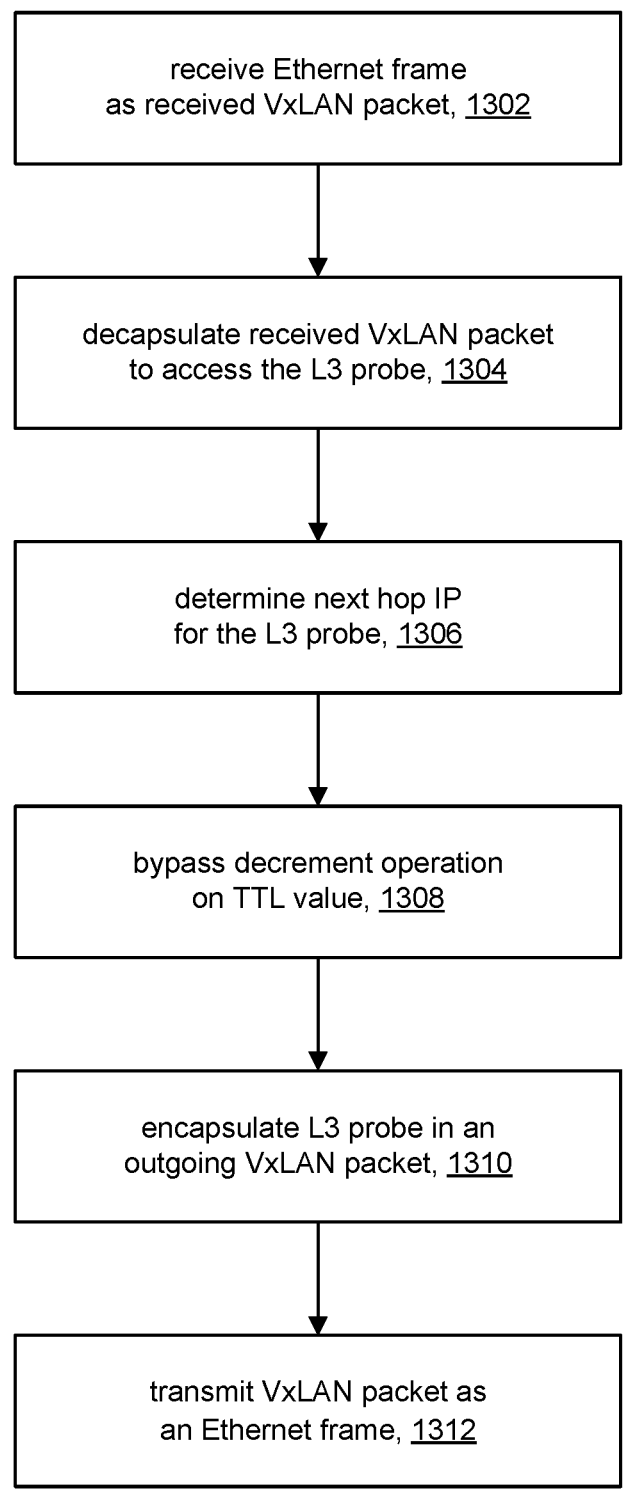
FIG. 13 illustrates processing in a network device to sustain a packet loop in accordance with the present disclosure.

The discussion will now continue with FIG. 13 to describe processing for sustaining a packet loop in accordance with the present disclosure, where the L3 probe is continuously forwarded between the initiating router and the participating endpoint router after initial injection of the L3 probe, which in our example are routers 1002 and 1004, respectively. In accordance with the present disclosure, it is understood that the following operations are performed by respective packet processors in both routers in order to sustain a packet loop. For discussion purposes, however, the operations will be explained from the point of view of the participating router (e.g., router 1004). In some embodiments, a packet processor (e.g., 312a, FIG. 3) in the data plane of the router can comprise control logic (e.g., ASIC, FPGA) configured to operate in accordance with FIG. 13. Notably, the control plane does not participate in the operations of FIG. 13.

At operation 1302, a packet processor in the participating router can receive the Ethernet frame from the initiating router as a received VxLAN packet. In our example, the Ethernet frame is routed from router 1002 and received at router 1004 as an incoming VxLAN packet containing the following information:

TABLE 7

| VxLAN packet (received at router 1004) | |
|---|---|
| outer source MAC | MAC-B |
| outer destination MAC | MAC-20 |
| outer source IP | IP-10 |
| outer destination IP | IP-20 |
| inner Ethernet frame | |
|    inner source MAC | MAC-10 |
|    inner destination MAC | MAC-20 |
|    L3 probe | |
|       inner source IP | $IP_{res}$ |
|       inner destination IP | $IP_{res}$ |

At operation 1304, the packet processor can decapsulate the received VxLAN packet to access the L3 probe; see FIG. 11A, for example, which shows the encapsulation of probe packet 1052 in VxLAN packet 132. In some embodiments, for example, the decapsulation can be performed by the VTEP functionality of the packet processor, which in our example is VTEP-20.

At operation 1306, the packet processor can determine the next hop IP (destination) for the L3 probe. The L3 probe will be forwarded to the next hop IP, which is determined based on the destination IP address (1054, FIG. 11A) in the L3 probe by operation of VTEP-2 executing on the packet processor in router 1004. Generally, a router includes a routing table that is keyed by the destination IP address contained in the incoming packet and stores next hop information for forwarding outgoing IP packets. In the context of VxLAN, the next hop information can include the IP address of the destination VTEP (next hop IP), the VNI of the VxLAN segment to send the outgoing packet on, the router MAC of the destination VTEP, and an egress port of the router to send the outgoing packet out of.

In accordance with the present disclosure, the destination IP address in the L3 probe, namely the reserved IP address $IP_{res}$, is the search key into the routing table, which can be programmed in the routing table as a static address with the following next hop IP information:

$IP_{res}/32$ (key)→VTEP-IP, $VNI_{res}$, router-MAC (next hop information)

where $VNI_{res}$ is a reserved VNI used for packet loops to avoid interfering with actual VNIs used by the system, and VTEP-IP and router-MAC identify the destination. In our specific example, the routing table in router 1004 can include the following static address entry:

$IP_{res}/32$ (key)→IP-10, $VNI_{res}$, MAC-10 (next hop information)

where IP-10 is the next hop IP address for VTEP-10 in router 1002 (next hop device) and MAC-10 is the MAC address for router 1002.

Generally, the routing table, also referred to as the routing information base (RIB) is stored in the control plane of the router. However, in some embodiments, certain routes in the routing table can be selected by a routing algorithm and downloaded to a forwarding table in the data plane of the router referred to as the forwarding information base (FIB). This allows packet processors in the data plane to access the forwarding table to enable high speed routing and at the same time allows the control plane to process the routing table, for example to make updates, without affecting forwarding activity in the data plane. In some embodiments, the routing algorithm can be configured to select the above static IP address for download from the routing table in the control plane to the forwarding table in the data plane.

Since the inner destination IP of the received L3 probe is set to equal to $IP_{res}$, the packet processor can do a table lookup on the forwarding table on $IP_{res}$ to determine, in our example, that the next hop IP destination is VTEP-10 (IP-10) in router 1002 (MAC-10) over the VxLAN segment identified as $VNI_{res}$.

At operation 1308, the packet processor can bypass a decrement operation on the TTL value in the L3 probe. Recall that in some embodiments, the L3 probe is an IP packet. As shown in FIGS. 11A, 11B, the IP header portion of the IP packet includes a TTL (time to live) value 1106. The TTL value 1106 specifies the maximum number of Layer 3 hops that the IP packet can make. Generally, each time an IP packet arrives at a Layer 3 network device (a hop) the TTL value 1106 is reduced by one before it is forwarded. When the TTL value reaches zero, the IP packet is dropped. The TTL value mechanism prevents IP packets from getting stuck in routing loop.

In contrast, in accordance with the present disclosure, the decrement operation on the TTL 1106 in the L3 probe is bypassed, precisely so that the probe can be sustained in a loop between the endpoint routers. In some embodiments, for example, setting the source and destination IP addresses in the IP header portion of the L3 probe can indicate to the packet processor to skip the decrement operation of the TTL value 1106. In other embodiments, the TTL value 1106 can be reset to some non-zero value in place of the decrement operation. This allows the participating router to be a conventional router that decrements the TTL value.

At operation 1310, the packet processor can encapsulate the L3 probe, received at operation 1302, in an outgoing VxLAN packet. In some embodiments, the L3 probe can be encapsulated in an inner Ethernet frame, which in turn can then be encapsulated in a VxLAN packet, as shown in FIG. 11B for example. In our example, the VxLAN packet from router 1004 contains the following relevant information:

TABLE 8

| VxLAN packet (from router 1004) | |
|---|---|
| outer source MAC | MAC-20 |
| outer destination MAC | MAC-B |
| outer source IP | IP-20 |

TABLE 8-continued

| | |
|---|---|
| outer destination IP | IP-10 |
| inner Ethernet frame | |
|     inner source MAC | MAC-20 |
|     inner destination MAC | MAC-10 |
|     L3 probe | |
|         inner source IP | $IP_{res}$ |
|         inner destination IP | $IP_{res}$ | where the outer source MAC address is the MAC address of router 1004, namely MAC-20, and the destination MAC address is the MAC address of router 114, namely MAC-B. The outer source IP address is the IP address associated with VTEP-20 in router 1004 (i.e., IP-20) and the outer destination IP address is the IP address associated with VTEP-10 in router 1002 (i.e., IP-10). The source and destination MAC addresses of the inner Ethernet frame identify the source and destination routers, namely MAC-20 and MAC-10, respectively. The inner source and destination IP addresses in the received L3 probe remain unchanged.

At operation 1312, the packet processor can transmit the outgoing VxLAN packet as an Ethernet frame, thus returning the same L3 probe back to router 1002.

The discussion will now turn to a description of sustained operation of the L3 loop. When router 1002 receives the routed Ethernet frame from router 1004, the packet processor in router 1002 will process the Ethernet frame according to FIG. 13. Of particular note, at operation 1306, operation of VTEP-10 in router 1002 will identify the next hop IP using its router table. In accordance with the present disclosure, the reserved IP address $IP_{res}$ can be entered in the routing table of router 1002 as a static address with the following next hop IP information:

$IP_{res}$→IP-20, $VNI_{res}$, MAC-20 where IP-20 is the IP address for VTEP-20 in router 1004 and MAC-20 is the MAC address for router 1004. As explained above, this static IP address can be downloaded to the forwarding table in the data plane of router 1002. The inner destination IP of the L3 probe received by router 1002 is set to equal to $IP_{res}$, so a table lookup in the forwarding table for $IP_{res}$ will determine that the next hop IP destination is VTEP-20 (IP-20) in router 1004 (MAC-20) over the VxLAN segment identified as $VNI_{res}$. At operation 1310, the packet processor in router 1002 will generate a VxLAN packet that encapsulates the same L3 probe with the following:

TABLE 9

| VxLAN packet (from router 1002) | |
|---|---|
| outer source MAC | MAC-10 |
| outer destination MAC | MAC-A |
| outer source IP | IP-10 |
| outer destination IP | IP-20 |
| inner Ethernet frame | |
|     inner source MAC | MAC-10 |
|     inner destination MAC | MAC-20 |
|     L3 probe | |
|         inner source IP | $IP_{res}$ |
|         inner destination IP | $IP_{res}$ |

The VxLAN packet shown in TABLE 9 contains the same information as the VxLAN packet shown in TABLE 6, which was the VxLAN packet sent by switch 1002 to initiate the L3 loop.

When router 1004 receives the above VxLAN packet from router 1002, router 1004 will process the received VxLAN packet according to FIG. 13, and respond by forwarding the same L3 probe back to router 1002 in a VxLAN packet configured according to TABLE 8. Router 1002 in turn will respond (per FIG. 13) by forwarding the same L3 probe back to router 1004 in a VxLAN packet configured according to TABLE 9, and so on so that the L3 probe is continuously forwarded between router 1002 and router 1004 in a sustained packet loop. The L3 loop is sustained by (1) setting the inner destination IP addresses in the L3 probe to a reserved IP address and programming the routing table in each router to point to the other router and (2) setting the inner source IP equal to the inner destination IP which tells the packet processor to bypass decrementing the TTL value (1308, FIG. 13) so that the L3 probe does not get dropped.

Figure 14:
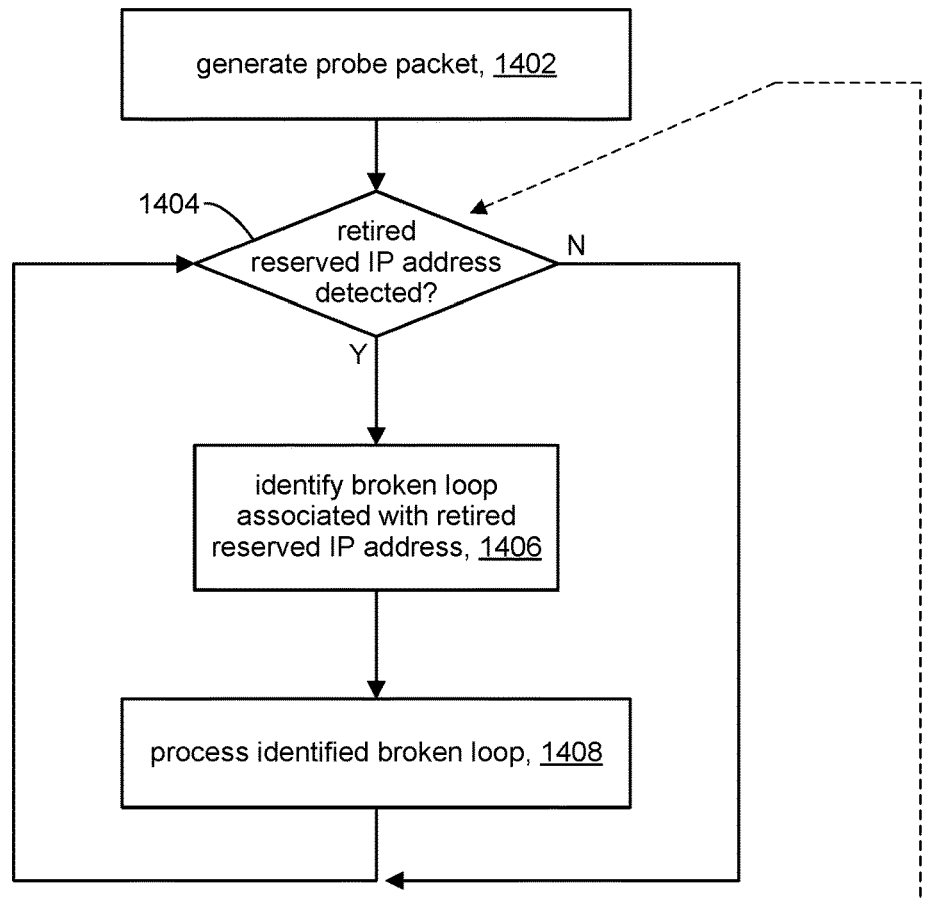
FIG. 14 illustrates processing in the control plane of a network device in accordance with the present disclosure.
Figure 15:
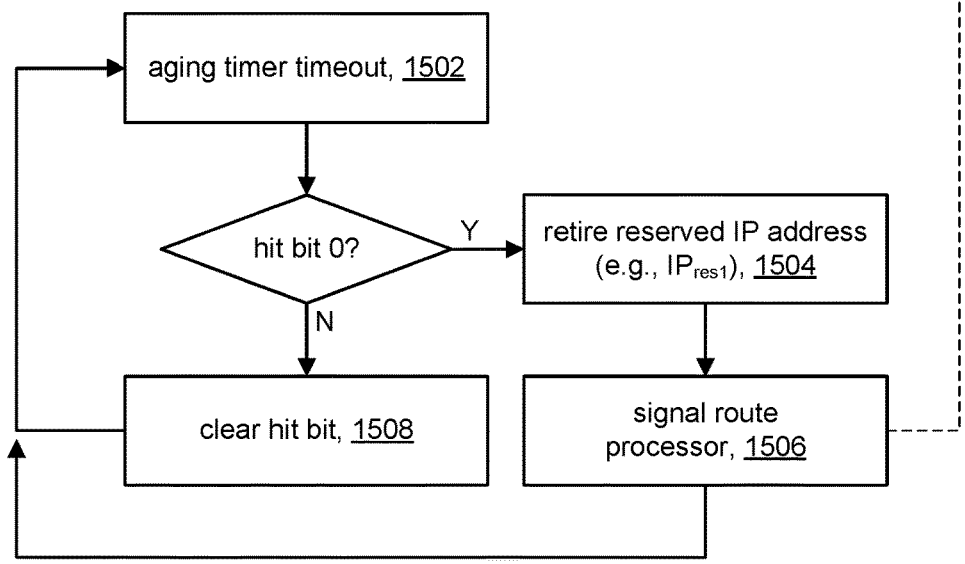
FIG. 15 illustrates an aging mechanism in accordance with the present disclosure.

Referring to FIGS. 14 and 15, the discussion will now turn to a description of processing in a router (e.g., router 1002, 1004, FIG. 10) to set up and manage or otherwise administer L3 loops in accordance with the present disclosure. In some embodiments, router 1002 can include computer executable program code, which when executed by a route processor (e.g., 308) in the control plane of the router, can cause the processor to operate in accordance with FIGS. 14 and 15.

At operation 1402, the control plane in the initiating router can generate a probe packet to initiate an L3 loop in accordance with the present disclosure.

At operation 1404, the control plane in either the initiating router or the non-initiating router can detect the occurrence of retired reserved IP addresses. In some embodiments, a routing table aging mechanism can be used to retire reserved IP addresses. In some embodiments, for example, the aging mechanism can be based on hit bits, where each entry in the routing table having a reserved IP address is associated with a hit bit. Each time a lookup in the routing table is made on a reserved IP address, the hit bit associated with the matching entry can be set (e.g., logic '1').

Referring for a moment to FIG. 15, in some embodiments, the aging mechanism can include a process that uses an aging timer to periodically inspect the hit bits associated with reserved IP addresses in the routing table. In some embodiments, for example, the timeout period can be programmable/configurable and can range from milliseconds to fractions of a millisecond. When the aging timer times out at 1502, the aging process can check the hit bit of each entry in the routing table that contains a reserved IP address. If the hit bit is cleared, the associated entry can be retired at 1504; e.g., by marking the entry as being unused. Since the hit bit associated with an entry is set each time a lookup on the entry is made, if the hit bit is cleared, that indicates a lookup on the entry had not occurred during the aging timer timeout period. The entry can be deemed to be old and hence can be retired from the routing table. At 1506, the aging process can signal the route processor in the control plane using any suitable aging alarm (e.g., 428) to inform the control plane that a reserved IP address has been retired. Processing can return to 1502 for another loop.

On the other hand, if the hit bit is set, then the aging process will simply clear the bit (e.g., logic '0') at 1508 and processing can return to 1502. As explained above, the hit bit is set each time a lookup on the entry is made. If the entry is active, then the hit bit will be re-set to logic '1' on the next lookup before the aging timer timeout period expires in the next loop. An entry in the routing table is therefore deemed "active" if a lookup on the entry is made within the timeout period.

Returning to FIG. 14, in the case of an L3 probe running in an L3 loop, each time the router receives the L3 probe, processing the received L3 probe will result in routing table look up on the reserved IP address of the L3 probe, thus setting the associated hit bit. So long as the data path remains up, the hit bit associated with the reserved IP address will always be set by the packet processor even though the aging process periodically clears it per FIG. 15. However, a fault can occur in the data path that breaks the L3 loop and L3 probes are no longer forwarded between the two routers. When the hit bit is cleared by the aging process at 1506, in that situation, the hit bit will not be subsequently re-set back to logic '1'. When the aging process sees a cleared bit for the reserved IP address, the aging process will retire that reserved IP address (operation 1504) and signal the route processor of the occurrence of a retired reserved IP address (e.g., $IP_{res1}$).

At operation 1406, the control plane can process a retired reserved IP address. Recall that each L3 loop is associated with a corresponding reserved IP address. Accordingly, the control plane can identify the corresponding L3 loop that is broken based on the retired reserved IP address.

At operation 1408, the control plane can process the identified broken L3 loop. In some embodiments, for example, the control plane can initiate a convergence sequence in order to identify an alternative path between the two routers. In some embodiments, the control plane can throw an alarm to signal a user (e.g., network administrator) of the downed port, or to take any other suitable action.

The operations of FIG. 14 can be performed in the control planes of both routers participating in the L3 loop, and so the retired reserved IP address can be detected by both routers. Accordingly, either or both of the routes can handle the detection of a broken by declaring the link down and triggering various actions.

In other embodiments, the hit bit setting mechanism described above can be rule-based. For example, packet processors generally use rules stored in a content-addressable memory such as a ternary content-addressable memory (TCAM) to make forwarding decisions. A TCAM rule can be defined that is triggered when the inner source and destination IP addresses are equal, indicating the presence of an L3 probe. The TCAM rule can set a corresponding hit bit each time the rule is triggered.

The discussion will now turn to some use cases to illustrate the utility of packet loops in accordance with the present disclosure.

Use Case 1

Figure 16:
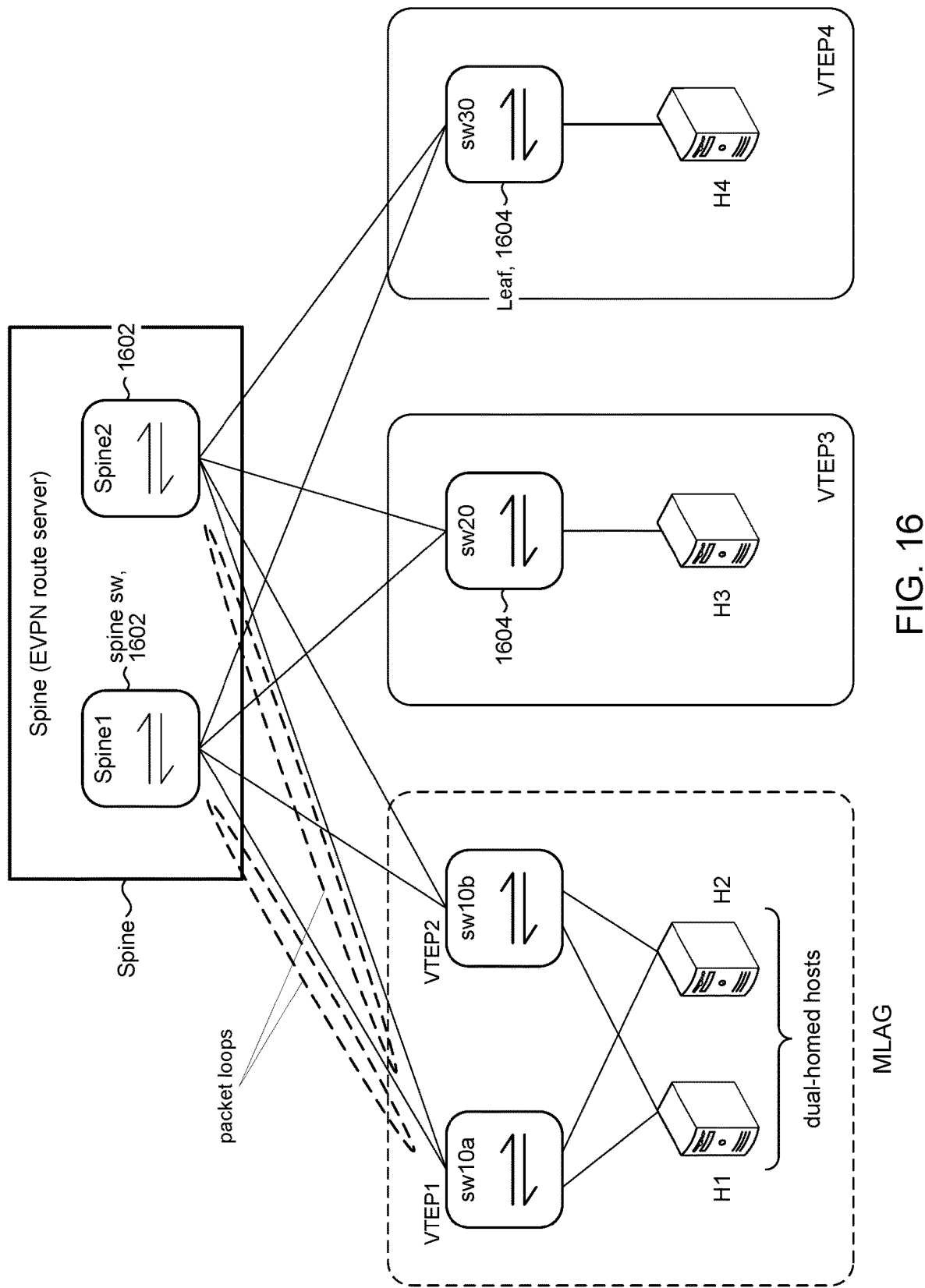
FIGS. 16 and 17 depict use cases to illustrate aspects of the present disclosure.

FIG. 16 shows an Ethernet VPN (EVPN) in an EVPN-VxLAN architecture adapted in accordance with the present disclosure. EVPN-VxLAN can support a configuration of multiple VTEPs. More specifically, the EVPN-VxLAN is based on a hierarchical 2-tier Leaf and Spine architecture, known as a Clos topology, where hosts H1, H2, H3, H4 connect to respective Leaf switches 1604 (Leafs) configured as VTEPs, and the Leafs are connected to a collection of Spine switches 1602. The Leaf and Spine architecture is a modular design that can scale horizontally as the number of VTEPs increase. Communication between VTEPs occurs via the Spine. The Border Gateway Protocol (BGP) can be used to perform routing between all of these point-to-point links. The Spine is used as an EVPN route server to avoid full mesh overlay EVPN peering between Leaf VTEPs. For logical isolation and easier troubleshooting, typically EVPN peering is enabled on a separate session between loopbacks (multi-hop BGP) different from underlay point-to-point BGP peering.

As can be seen in the figure, the Leaf switches 1604 connect directly to the Spine switches 1602, and not to other Leaf switches. When a Leaf switch goes down or when the VTEP running on a Leaf switch reboots, the Spine switches 1602 that the Leaf switch is connected to will withdraw the associated VTEP from their overlay routing tables. However, the Spine switches will not detect a "downed" VTEP until after expiration of a BGP hold time (referred to as the Hold-down timer), which can be on the order of tens of seconds. As such, the VxLAN can experience significant traffic loss during the BGP hold time.

In accordance with the present disclosure, a packet loop can be set up between each Leaf switch (e.g., sw10a) and each Spine switch (e.g., Spine1, Spine2). As noted above, since a probe packet is forwarded in the data planes using the same hardware and firmware that is used for processing regular network traffic, the packet loop can run at a speed comparable to wire speed. A path fault between a Leaf switch and a Spine switch can therefore be detected much more quickly (e.g., in fractions of a second) than the BGP hold time, thus improving network performance by reducing the amount of traffic disruption as compared to not using a packet loop of the present disclosure.

Consider the traffic flow between hosts H1 and H4, for example. VTEP4 will see an ECMP (equal cost multi-path) overlay to get to H1 via VTEP1 and VTEP2 comprising the following paths:

path1: H4→VTEP4→Spine1→VTEP1→H1
path2: H4→VTEP4→Spine2→VTEP1→H1
path3: H4→VTEP4→Spine1→VTEP2→H1
path4: H4→VTEP4→Spine2→VTEP2→H1

If VTEP1 goes down or reboots, Spine1 and Spine 2 will detect a break in the respective packet loops with sw10a. Spine1 and Spine2 can take immediate action, for example, invalidating path1 and path2, without having to wait for timeout of the BGP hold time.

Use Case 2

Figure 17:
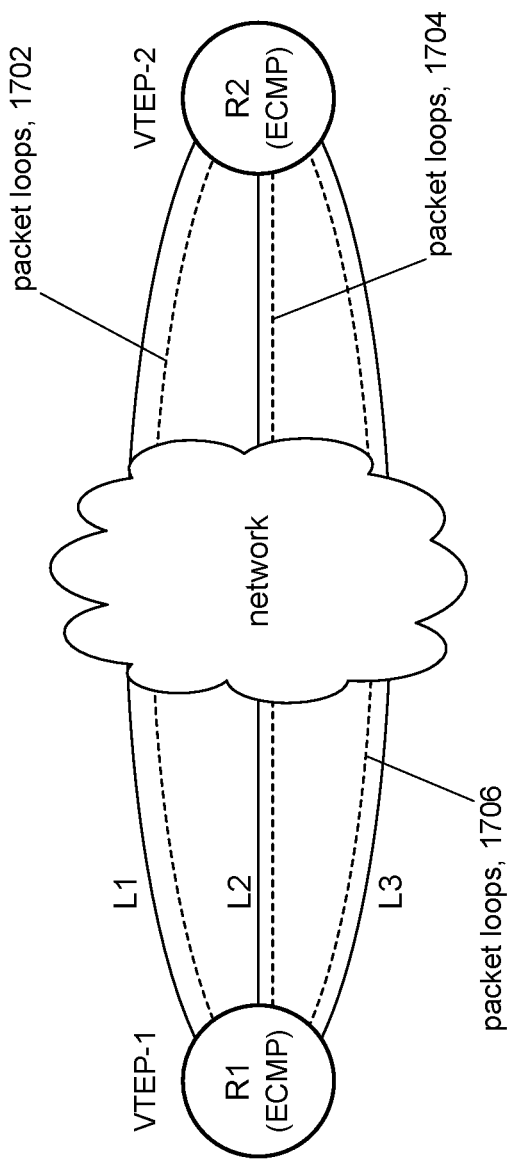

FIG. 17 shows a configuration between two VTEP-enabled routers (R1, R2) where the routers are connected by multiple underlay paths (links L1, L2, L3). The routers employ the Equal-Cost Multi-Path (ECMP) routing strategy to select a path for forwarding a packet. When a path (e.g., L1) goes down, the ECMP strategy should be made aware of that fact so that the downed path does not get selected to carry network traffic.

ECMP provides a per-flow load balancing forwarding mechanism that distributes traffic over multiple links based on certain parameters. ECMP load balancing distributes packets across multiple links based on Layer 3 routing information. If the router discovers multiple paths to a destination, the routing table is updated with multiple entries for that destination. Per-flow load balancing allows the router to use multiple paths to achieve load sharing based on the flow tuple. Packets for a given flow tuple are guaranteed to take the same path, even if multiple paths are available. Traffic streams with different flow tuples tend to take different paths In a VxLAN, the ECMP strategy uses the inner source and destination MAC of the inner Ethernet frame (e.g., FIG. 2A). With VxLAN encapsulation, the source port of the UDP header provides the entropy needed for ECMP load distribution. The entropy that comes from the session discriminator (LMAC for L2 probe and $IP_{res}$ for L3 probe in the previous examples) is in-turn transferred to the source port of the outer UDP header post encapsulation of the probe.

In some embodiments, for example, several packet loops 1702, 1704, 1706 can be initiated (e.g., from router R1) between routers R1, R2 on respective paths L1, L2, L3. The inner source and destination MAC addresses for each probe packet can be randomly generated. This will cause router R1 to select different paths from its forwarding table for each probe packet. If the number of packet loops is sufficiently larger than the number of paths L1-L3 between routers R1, R2, then there is a good chance that each path will have at least one packet loop running on it. If any path L1, L2, L3 goes down, the associated packet loop will be broken; the routers can detect the broken loop and take appropriate action.

FURTHER EXAMPLES

In accordance with the present disclosure, a method in a first network node for monitoring a data forwarding path between the first network node and a second network node includes the first network node: transmitting a probe packet to the second network node, the probe packet being contained in a first packet, the first packet having an outer destination address set to an address of the second network node, the probe packet having an inner source address and an inner destination address both set to a predetermined address; receiving the probe packet from the second network node, the probe packet being contained in a second packet having an outer destination address determined based on a mapping in the second network node that maps the predetermined address contained in the inner destination address of the probe packet to the first network node; and forwarding the probe packet received from the second network node in another instance of the first packet having an outer destination address set in accordance with the predetermined address contained in the inner destination address of the probe packet, wherein a mapping in the first network node maps the predetermined address to the second network node to initiate a packet loop that continuously forwards the probe packet between the first network node and the second network node.

In some embodiments, the method further includes retiring the mapping in the first network node when no probe packet has been received from the second network node within a predetermined period of time. The method further includes throwing a fault in response to retiring the mapping in the first network node.

In some embodiments, the method further includes encapsulating the probe packet in accordance with a tunneling protocol to generate the first packet.

In some embodiments, the method further includes generating a locally administered MAC address as the predetermined address.

In some embodiments, the mapping in the first network node is an entry in a MAC address table, wherein the entry in the MAC address table is defined based on the inner source address of the probe packet.

In some embodiments, the probe packet is an Internet Protocol (IP) packet and the predetermined address is a reserved IP address.

In some embodiments, the mapping in the first network node is a predetermined entry in a routing information base that maps the predetermined address in the probe packet to an IP address of the second network node.

In some embodiments, the probe packet further includes an inner source address that is set to the predetermined address, wherein the probe packet further includes a time-to-live (TTL) value, wherein the TTL value is not decremented in response to a determination that the inner source address and the inner destination address of the probe packet are set to the same address.

In accordance with the present disclosure, a network device includes a processor, and control logic which, when operated, controls the processor to operate the network device as an initiating network device to transmit an encapsulated probe packet to a participating network device, the probe packet having an inner source address and an inner destination address both set to a predetermined address; receive the probe packet from the participating network device, the probe packet being returned to the initiating network device based on a first mapping that maps the predetermined address contained in the inner destination address of the probe packet to the initiating network device; and forward another instance of the probe packet to the participating network device based on a second mapping that maps the predetermined address to the participating network device to initiate a packet loop that continuously forwards the probe packet between the initiating network device and the participating network device.

In some embodiments, the control logic which, when operated, further controls the processor to operate the initiating network device to retire the second mapping when no probe packet has been received by the initiating network device within a predetermined period of time.

In some embodiments, the probe packet is encapsulated in accordance with a tunneling protocol.

In some embodiments, the control logic which, when operated, further controls the processor to operate the initiating network device to generate a locally administered MAC address as the predetermined address.

14 In some embodiments, the second mapping is an entry in a MAC address table stored in the initiating network device, wherein the entry in the MAC address table is defined based on the inner source address of the probe packet.

In some embodiments, the probe packet is an Internet Protocol (IP) packet and the predetermined address is a reserved IP address.

In some embodiments, the second mapping is a predetermined entry in a routing information base stored in the initiating network device that maps the predetermined address in the probe packet to an IP address of the participating network device.

In some embodiments, the probe packet further includes an inner source address that is set to the predetermined address, wherein the probe packet further includes a time-to-live (TTL) value, wherein the TTL value is not decremented in response to a determination that the inner source address and the inner destination address of the probe packet are set to the same address.

In accordance with the present disclosure, a network device includes a processor and control logic which, when operated, controls the processor to operate the network device to: receive packets sent from a sending device; periodically inspect a hit bit associated with a predetermined address to determine whether the hit bit is set to a first value or a second value; and signal an alarm in response to determining that the hit bit is set to the second value. The hit bit associated with the predetermined address is set to the first value each time a received packet has encapsulated therein a probe packet that includes an inner source address and an inner destination address that are both set to the predetermined address. The hit bit associated with the predetermined address is set to the second value after a predetermined period of time has passed without receiving a packet having a probe packet that includes an inner source address and an inner destination address that are both set to the predetermined address.

In some embodiments, the control logic which, when operated, further controls the processor to operate the network device to receive the predetermined address from the sending device.

In some embodiments, the control logic which, when operated, further controls the processor to operate the network device to receive the predetermined period of time from the sending device.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims.

Based on the above disclosure and the following claims, other arrangements, embodiments, implementations and equivalents may be employed without departing from the scope of the present disclosure as defined by the claims.

What is claimed is:

1. A method in a first network node for monitoring a data forwarding path between the first network node and a second network node, the method comprising the first network node:
   transmitting a probe packet to the second network node, the probe packet being contained in a first packet, the first packet having an outer destination address set to an address of the second network node, the probe packet having an inner source address and an inner destination address both set to a same predetermined address;
   receiving the probe packet from the second network node, the probe packet being contained in a second packet having an outer destination address determined based on a mapping in the second network node that maps the predetermined address contained in the inner destination address of the probe packet to the first network node; and
   forwarding the probe packet received from the second network node in another instance of the first packet having an outer destination address set in accordance with the predetermined address contained in the inner destination address of the probe packet, wherein a mapping in the first network node maps the predetermined address to the second network node to initiate a packet loop that continuously forwards the probe packet between the first network node and the second network node.

2. The method of claim 1, further comprising retiring the mapping in the first network node when no probe packet has been received from the second network node within a predetermined period of time.

3. The method of claim 2, further comprising throwing a fault in response to retiring the mapping in the first network node.

4. The method of claim 1, further comprising encapsulating the probe packet in accordance with a tunneling protocol to generate the first packet.

5. The method of claim 1, further comprising generating a locally administered MAC address as the predetermined address.

6. The method of claim 1, wherein the mapping in the first network node is an entry in a MAC address table, wherein the entry in the MAC address table is defined based on the inner source address of the probe packet.

7. The method of claim 1, wherein the probe packet is an Internet Protocol (IP) packet and the predetermined address is a reserved IP address.

8. The method of claim 1, wherein the mapping in the first network node is a predetermined entry in a routing information base that maps the predetermined address in the probe packet to an IP address of the second network node.

9. The method of claim 1, wherein the probe packet further includes an inner source address that is set to the predetermined address, wherein the probe packet further includes a time-to-live (TTL) value, wherein the TTL value is not decremented in response to a determination that the inner source address and the inner destination address of the probe packet are set to the same address.

10. A network device comprising:
a processor; and
control logic which, when operated, controls the processor to operate the network device as an initiating network device to:
transmit an encapsulated probe packet to a participating network device, the probe packet having an inner source address and an inner destination address both set to a same predetermined address;
receive the probe packet from the participating network device, the probe packet being returned to the initiating network device based on a first mapping that maps the predetermined address contained in the inner destination address of the probe packet to the initiating network device; and
forward another instance of the probe packet to the participating network device based on a second mapping that maps the predetermined address to the participating network device to initiate a packet loop that continuously forwards the probe packet between the initiating network device and the participating network device.

11. The network device of claim 10, wherein the control logic which, when operated, further controls the processor to operate the initiating network device to retire the second mapping when no probe packet has been received by the initiating network device within a predetermined period of time.

12. The network device of claim 10, wherein the probe packet is encapsulated in accordance with a tunneling protocol.

13. The network device of claim 10, wherein the control logic which, when operated, further controls the processor to operate the initiating network device to generate a locally administered MAC address as the predetermined address.

14. The network device of claim 10, wherein the second mapping is an entry in a MAC address table stored in the initiating network device, wherein the entry in the MAC address table is defined based on the inner source address of the probe packet.

15. The network device of claim 10, wherein the probe packet is an Internet Protocol (IP) packet and the predetermined address is a reserved IP address.

16. The network device of claim 10, wherein the second mapping is a predetermined entry in a routing information base stored in the initiating network device that maps the predetermined address in the probe packet to an IP address of the participating network device.

17. The network device of claim 10, wherein the probe packet further includes an inner source address that is set to the predetermined address, wherein the probe packet further includes a time-to-live (TTL) value, wherein the TTL value is not decremented in response to a determination that the inner source address and the inner destination address of the probe packet are set to the same address.

18. A network device comprising:
a processor; and
control logic which, when operated, controls the processor to operate the network device to:
receive packets sent from a sending device;
periodically inspect a hit bit associated with a predetermined address to determine whether the hit bit is set to a first value or a second value; and
signal an alarm in response to determining that the hit bit is set to the second value,
wherein:
the hit bit associated with the predetermined address is set to the first value each time a received packet has encapsulated therein a probe packet that includes an inner source address and an inner destination address that are both set to the predetermined address, and
the hit bit associated with the predetermined address is set to the second value after a predetermined period of time has passed without receiving a packet having a probe packet that includes an inner source address and an inner destination address that are both set to the predetermined address.

19. The network device of claim 18, wherein the control logic which, when operated, further controls the processor to operate the network device to receive the predetermined address from the sending device.

20. The network device of claim 18, wherein the control logic which, when operated, further controls the processor to operate the network device to receive the predetermined period of time from the sending device.

* * * * *